(12) United States Patent
Bikson

(10) Patent No.: US 11,511,238 B1
(45) Date of Patent: Nov. 29, 2022

(54) COMPOSITE COVALENT ORGANIC FRAMEWORK MEMBRANES

(71) Applicant: Avanpore LLC, Newton, MA (US)

(72) Inventor: Benjamin Bikson, Newton, MA (US)

(73) Assignee: Avanpore LLC, Newton, MA (US)

( * ) Notice: Subject to any disclaimer, the term of this patent is extended or adjusted under 35 U.S.C. 154(b) by 0 days.

(21) Appl. No.: 17/862,810

(22) Filed: Jul. 12, 2022

Related U.S. Application Data

(60) Provisional application No. 63/223,701, filed on Jul. 20, 2021.

(51) Int. Cl.
*B01D 71/52* (2006.01)
*B01D 67/00* (2006.01)
*B01D 69/12* (2006.01)

(52) U.S. Cl.
CPC ..... *B01D 71/5222* (2022.08); *B01D 67/0023* (2013.01); *B01D 67/0083* (2013.01); *B01D 67/00933* (2022.08); *B01D 69/1214* (2022.08); *B01D 69/1216* (2022.08); B01D 2313/20 (2013.01); B01D 2323/081 (2022.08); B01D 2323/18 (2013.01); B01D 2323/30 (2013.01); B01D 2325/52 (2022.08)

(58) Field of Classification Search
CPC ............ B01D 71/5222; B01D 67/0023; B01D 67/0083; B01D 67/00933; B01D 69/1214; B01D 69/1216; B01D 2313/20; B01D 2323/081; B01D 2323/18; B01D 2323/30; B01D 2325/52
See application file for complete search history.

(56) References Cited

U.S. PATENT DOCUMENTS

| | | |
|---|---|---|
| 4,721,732 A | 1/1988 | Dubrow et al. |
| 4,957,817 A | 9/1990 | Chau et al. |
| 4,992,485 A | 2/1991 | Koo et al. |
| 5,064,580 A | 11/1991 | Beck et al. |

(Continued)

OTHER PUBLICATIONS

Bertrand, P., et al., "Ultrathin polymer coatings by complexation of polyelectrolytes at interfaces: suitable materials, structure and properties", Macromolecules Rapid Communications, (2000), V21, p. 319-348.

(Continued)

*Primary Examiner* — Krishnan S Menon
(74) *Attorney, Agent, or Firm* — Forge IP, PLLC

(57) ABSTRACT

Disclosed is the preparation of composite fluid separation membranes based on poly (aryl ether ketone) (PAEK) polymers with the separation layer formed by a layer-by-layer reticular synthesis. The porous PAEK substrate is semicrystalline, exhibits a mesoporous surface structure, and is surface functionalized. The separation layer formed by the hierarchical layer-by-layer process is in the form of a covalent organic network integrally linked via covalent bonds to the functional groups of the substrate. The composite separation layer may be synthesized in situ in a preformed separation device on the surface of the PAEK substrate. Device configurations include flat sheet, spiral wound, monolith, and hollow fiber configurations with the hollow fiber configuration being preferred. Hollow fibers are formed from PAEK polymers with poly (ether ether ketone) and poly (ether ketone) particularly preferred. Composite PAEK membranes of the present invention are useful for a broad range of fluid separation applications.

48 Claims, 10 Drawing Sheets

(56) References Cited

U.S. PATENT DOCUMENTS

| | | | |
|---|---|---|---|
| 5,089,192 | A | 2/1992 | Costa |
| 5,205,968 | A | 4/1993 | Damrow et al. |
| 5,227,101 | A | 7/1993 | Mahoney et al. |
| 5,260,415 | A | 11/1993 | David |
| 5,651,931 | A | 7/1997 | Bailey et al. |
| 5,997,741 | A | 12/1999 | Shimoda et al. |
| 6,017,455 | A | 1/2000 | Shimoda et al. |
| 6,887,408 | B2 | 5/2005 | Yuan |
| 7,176,273 | B2 | 2/2007 | Yuan et al. |
| 7,229,580 | B2 | 6/2007 | Yuan |
| 7,368,526 | B2 | 5/2008 | Yuan et al. |
| 7,407,609 | B2 | 8/2008 | Brown |
| 7,439,291 | B2 | 10/2008 | Wang et al. |
| 9,610,547 | B2 | 4/2017 | Ding et al. |
| 9,908,985 | B2 | 3/2018 | Iliuta et al. |
| 10,328,425 | B2 | 6/2019 | Haring |
| 10,376,846 | B2 | 8/2019 | Ding et al. |
| 10,654,002 | B2 | 5/2020 | Dubois et al. |
| 10,668,435 | B2 | 6/2020 | Karnik et al. |

OTHER PUBLICATIONS

Shuai Cao et al., "Design and synthesis of covalent organic frameworks towards energy and environment fields", Chemical Engineering Journal, (2019), V. 355, p. 602-623.
Chen, G., et al., "Pore Structure and Properties of PEEK Hollow Fiber Membranes: Influence of the Phase Structure Evolution of PEEK/PEI Composite"; Polymers 2019, 11, 1398; doi:10.3390/polym11091398.
Dai, J., et al., "Controlling the Permeability of Multilayered Polyelectrolyte Films through Derivatization, Cross-Linking, and Hydrolysis", Langmuir, (2001), V. 17, p. 931-937.
Christian S. Diercks and Omar M. Yaghi,"The atom, the molecule, and the covalent organic framework", Science, (2017), V. 355, issue 6328, p. 923.
Ding, Y., et al., "Preparation and characterization of semi-crystalline poly(ether ether ketone) nollow fiber membranes"; Journal of Membrane Science 357 (2010) 192-198.
Joris de Grooth et al., "Charged Micropollutant Removal with Hollow Fiber Nanofiltration Membranes Based on Polycation/Polyzwitterion/Polyanion Multilayers", SCS Applied Materials & Interfaces, (2014), V6, Issue 19, p. 17009-17017.
Michael D. Guiver, Gilies P. Robertson, and Stephen Foley, "Chemical Modification of Polysulfones II: An Efficient Method for Introducing Primary Amine Groups onto the Aromatic Chain", Macromolecules, (1995), V. 28, pp. 7612-7621.
Henneuse, C., et al., "Surface carboxylation of PEEK film by selective wet-chemistry"; Polymer vol. 39, No. 4, 1998, pp. 835-844.
Henneuse-Boxus, C., et al., "Surface functionalization of PEEK films using photochemical routes"; European Polymer Journal 37 (2001) 9-18.
Henneuse-Boxus, C., et al., "Covalent attachment of fluorescence probes on the PEEK-OH film surface"; Polymer 41 (2000) 2339-2348.

Wanqin Jin et al., "Use of Polyelectrolyte Layer-by-Layer Assemblies as Nanofiltration and Reverse Osmosis Membranes", Langmuir, (2003), V. 19, p. 2550-2553.
Peter M. Johnson et al., "Molecular Layer-by-Layer Deposition of Highly Crosslinked Polyamide Films", Journal of Polymer Science, Part B: Polymer Physics (2011), V. 50, p. 168-173.
Joseph, N., et al., "Layer-by-Layer Preparation of Polyelectrolyte Multilayer Membranes for Separation", Polymer Chemistry, (2014), V5(6), p. 1817-1831.
Soon-Bum Kwon et al., "Molecular layer-by-layer assembled forward osmosis membranes", Journal of Membrane Science, V. 488 (2015), p. 111.
Xiaoyun Liu et al., "Size-Selective Transport of Uncharged Solutes through Multilayer Polyelectrolyte Membranes", Chemical Materials, (2004), V.16, p. 351-357.
Yan Liu et al., "Preparation of Layer-by-Layer Nanofiltration Membranes by Dynamic Deposition and Crosslinking", Membranes, (2019), V.9, p. 20.
Chang Liu et al., "Enhanced hollow fiber membrane performance via semi-dynamic layer-by-layer polyelectrolyte inner surface deposition for nanofiltration and forward osmosis applications", Reactive & Functional Polymers, (2015), V. 86, p. 154-160.
Guanqing Liu et al., "Ion-exchange membranes prepared using layer-by-layer polyelectrolyte deposition", Journal of Membrane Science, (2010), V. 354, p. 198-205.
P. Manna et al., "Stepwise synthesis of oligoamide coating on a porous support: Fabrication of a membrane with controllable transport properties", Separation and Purification Technology, (2018), V. 213, pp. 11-18.
Mehta, R.H., et al., "Microporous membranes based on poly(ether ether ketone) via thermally-induced phase separation"; Journal of Membrane Science 107 (1995) 93-106.
Noiset, O., et al., "Surface Modification of Poly (aryl ether ether ketone) (PEEK) Film by Covalent Coupling of Amines and Amino Acids through a Spacer Arm"; Journal of Polymer Science: Part A: Polymer Chemistry, vol. 35, 3779-3790 (1997).
Noiset, O., et al., "Surface Reduction of Poly(aryl ether ether ketone) Film: UV Spectrophotometric, 3H Radiochemical, and X-ray Photoelectron Spectroscopic Assays of the Hydroxyl Functions"; Macromolecules 1997, 30, 540-548.
Zhenping Qin et al., "Synthesis of positively charged polyelectrolyte multi layer membranes for removal of divalent metal ions", Journal of Materials Research, (2013), V 28, issue 11, p. 1449-1457.
Richardson, J. J., et al., "Technology-driven layer-by-layer assembly of nanofilms", Science, (2015), V. 348, issue 6233, p. 411.
Linglong Shan et al., "Multifold Enhancement of Loose-Nanofiltration Membrane Performance by Intercalation of Surfactant Assemblies", ACS Environmental Science & Technology Letters, (2018), V5, issue 11, p. 668-674.
Rakesh Kumar Sharma et a., "Recent Development of Covalent Organic Frameworks (COFs): Synthesis and Catalytic (Organic-Electro-Photo) Applications", Materials-Horizons, (2020), V.7, issue 2, p. 411-454.
Zvi Steiner et al., "Development of an oligoamide coating as a surface mimetic for aromatic polyamide films used in reverse osmosis membranes", Chemical Communications., (2011), V. 47, p. 2384-2386.
Jing Wang et al., "Nanoscale tailor-made membranes for precise and rapid molecular sieve separation", Nanoscale, (2017), V. 9, p. 2942-2957.

COMPOSITE COVALENT ORGANIC FRAMEWORK MEMBRANES

FIELD OF THE INVENTION

This invention relates to the preparation and use of composite polymeric membranes for a broad range of fluid separations, and more particularly, to the preparation of composite polymeric membranes formed by the layer-by-layer deposition method on chemically functionalized porous poly (aryl ether ketone) substrates.

BACKGROUND OF THE INVENTION

Porous polymeric membranes are well known in the art and are used widely for filtration and purification processes, such as filtration of wastewater, desalination, preparation of ultra-pure water, and in medical, pharmaceutical or, food applications, including removal of microorganisms, dialysis and protein filtration. A membrane is generally defined as a selective barrier that permits the passage of one or more components through the membrane while retaining one or more components. Porous polymeric membranes are used to separate components of liquid mixtures by filtration, membrane distillation and as contactors to facilitate dissolution of gases in liquids or to remove gases from liquids, as membrane bioreactors, and in numerous other applications where they serve as a generic phase separator, for example, as a battery separator. The application spectrum of membrane processes stretches from filtration of solids up to separations in a molecular range. Pressure driven membrane processes, such as microfiltration (MF), ultrafiltration (UF), nanofiltration (NF) and reverse osmosis (RO), are established large scale industrial processes for water purification and recovery of high value substances. Initially applied to water-based systems, membrane separations are increasingly applied to non-water solvent-based systems as well.

Composite polymeric membranes that consist of a selective separation layer superimposed on a porous support constitute an advanced class of fluid separation membranes. Composite membranes are used in water purification and desalination and in gas separation applications, such as natural gas treatment, gas dehydration, and hydrogen recovery from petrochemical and refinery streams. The most commonly used RO membranes are composite. The composite RO membrane consists of three layers: a polyester web, a microporous polysulfone interlayer support and an ultra-thin polyamide barrier layer on the top surface formed by an interfacial polymerization process. Composite membranes are further utilized for vapor permeation, removal of dissolved gases from liquids, and dehydration of liquids. While these membranes have found broad utility for a variety of purposes, they suffer from several disadvantages: a broad and non-uniform pore size distribution, and a limited chemical, solvent and thermal resistance. This limits membrane utility in applications that require molecular level separations, such as the separation of active pharmaceutical ingredients, APIs. The synthesis of APIs is frequently carried out in aggressive solvent systems. Membranes capable of operation in aggressive chemical solvent systems at high temperatures while performing molecular level separations are thus needed.

Today's thin-film composite RO and NF membranes are made from polyamides assembled on porous supports by interfacial polymerization. However, these membranes suffer from low chemical stability, as the polyamides are not stable in the presence of hypochlorite, which is commonly used for disinfection and membrane cleaning. Furthermore, these membranes are mostly produced in a flat sheet geometry and packed into spiral-wound modules. Such modules cannot be cleaned by backwashing, which is the desired strategy for membrane cleaning. The packing density of spiral wound modules is low as compared to hollow fiber membrane modules. Tangential flow filtration processes are in need of a composite membrane preparation methodology applicable to hollow fiber module configurations.

The permeability of membranes is inversely proportional to their thickness. To maximize fluxes, the thickness of membranes should be as thin as possible. As thin layers (<200 nm) do not have enough mechanical strength to prevent them from rupturing, they can only function atop mechanically strong and porous support as a hierarchical (asymmetric) structure. The support layer does not contribute to the rejection and it is the active layer wherein the separation occurs. This structural advantage gives rise to a higher permeability and selectivity compared to symmetric membranes. Constructing composite membranes with a tailor-made thin selective layer is a practical and effective strategy to improve the performance of asymmetric membranes. By accurately manipulating the structure and the physicochemical properties of the selective layer, desired membranes can be fabricated to fulfill the demand for precise and rapid separation of molecules.

A number of approaches are known to form membranes with a controllable selective layer for precise and rapid separation of molecules. One of approach that is used extensively is based on advanced interfacial polymerization (IP). The method is simple, reproducible, easy to control and is used extensively to manufacture thin-film composite (TFC) membranes. TFC membranes are comprised of a highly crosslinked selective layer of a minimal thickness to maximize fluid permeability and minimize energy input. The advent of such TFC membranes has revolutionized water purification globally. The IP methodology has also been expanded to the fabrication of membranes for organic solvent-resistant nanofiltration (OSN), forward osmosis (FO), and even energy-efficient gas separations.

In the IP process, two monomers separately dissolved in immiscible solvents (e.g., water and non-polar organic solvent, such as hexane) react at the interface to form a polymer film that eventually self-terminates growth. The seemingly straightforward IP process turns out to be extremely complex when it concerns the relations among the preparation conditions, the film thickness, nanostructure, and permselectivity. A lack of efficient nanoscale control can lead to a film with poorly defined thickness, an irregular structure at all spatial scales, and defects. Diffusion control is a key factor to tune the membrane structure and performance during the IP process. The support layer that directly contacts the aqueous phase solution impacts the IP process and the performance of the TFC membrane. Even subtle changes derived from the support layer structure have a significant impact on the separation characteristics of the active layer, in part due to the changes in the separation layer surface roughness. The permeation separation performance can be also affected by the structure of the support. Recently a layer-by-layer (LbL) synthetic method of forming the separation layer has enabled some limitations of the traditional composite membrane preparation by the IP process to be overcome.

Over the past few decades, layer-by-layer (LbL) assembly of thin films has been developed to enable nanometer control over film thickness and an extensive choice of usable materials for coating planar and particulate substrates (Ref.

Joseph J. Richardson et al., "Technology-driven layer-by-layer assembly of nanofilms", Science, (2015), V. 348, issue 6233, p. 411). The choice of materials allows for responsive and functional thin films to be engineered for various applications, including membranes. The LbL method was applied primarily to the preparation of polyelectrolyte composite membranes. These membranes are formed by the layer-by-layer deposition of polyelectrolytes onto a preformed porous support. Preparation of LbL membranes by this methodology is described in the following references: Nithya Joseph et al., "Layer-by-Layer Preparation of Polyelectrolyte Multilayer Membranes for Separation", Polymer Chemistry, (2014), V. 5(6), p. 1817-1831; Joris de Grooth et al., "Charged Micropollutant Removal with Hollow Fiber Nanofiltration Membranes Based on Polycation/Polyzwitterion/Polyanion Multilayers", SCS Applied Materials & Interfaces, (2014), V6, Issue 19, p. 17009-17017; and Xiaoyun Liu et al., "Size-Selective Transport of Uncharged Solutes through Multilayer Polyelectrolyte Membranes", Chemical Materials, (2004), V. 16, p. 351-357.

By controlling the number of layers, their macromolecular nature, and their charge, polyelectrolyte (PE) multilayer membranes can be tailored to have designed properties. These membranes exhibit pore sizes and charges most applicable to nanofiltration applications and were initially directed toward water-softening. This manufacturing technique enables a better tuning of the membrane performance regarding the desired selectivity towards one or more components. The polyelectrolyte type membranes are tunable toward ion separation properties and are less selective towards separation of neutral substances.

In almost all cases, the LbL assemblies were prepared by adsorbing polyelectrolytes onto a porous substrate in a hierarchical sequential process. These layers are not covalently bound to the substrate. In some cases, the layers are deposited by a convective method, wherein polyelectrolyte bi-layers are adsorbed on the lumen surface of a porous hollow fiber support. The method is versatile, to be applied not only on a single membrane specimen but also on membranes being packaged into a module housing. This makes the convective methodology scalable towards industry scales. Polyelectrolyte composite LbL membrane assemblies comprise cationic and anionic polyelectrolytes (PE) adsorbed in a sequential manner into ultra-thin films (Ref. Yan Liu et al., "Preparation of Layer-by-Layer Nanofiltration Membranes by Dynamic Deposition and Crosslinking", Membranes, (2019), V. 9, p. 20); Chang Liu et al., "Enhanced hollow fiber membrane performance via semi-dynamic layer-by-layer polyelectrolyte inner surface deposition for nanofiltration and forward osmosis applications", Reactive & Functional Polymers, (2015), V. 86, p. 154-160). The adsorbed single layers are in the range of a few nanometers. The thickness, the structure, and thus the properties of the LbL films, are controlled by various parameters: the polyelectrolyte type, its molecular weight and concentration, the ionic strength and pH of the coating solution, adsorption time, coating method and number of layers.

The layer-by-layer approach has been also utilized to form ultra-thin polymeric layers and membranes via interfacial polymerization. Interfacial polymerization layers were formed by the LbL methodology on a gold surface (Ref. Zvi Steiner et al., "Development of an oligoamide coating as a surface mimetic for aromatic polyamide films used in reverse osmosis membranes", Chemical Communications, (2011), V. 47, p. 2384-2386)). P. Manna et al. describe preparation of composite membrane by LbL interfacial polymerization process (Ref. P. Manna et al., "Step-wise synthesis of oligoamide coating on a porous support: Fabrication of a membrane with controllable transport properties", Separation and Purification Technology, (2019), V. 213, pages 11-18). A tunable membrane was thus formed on a polyacrylonitrile support and the membrane separation characteristics correlated with the number of LbL deposition cycles.

Although LbL methods of forming composite membranes by interfacial polymerization or by polyelectrolyte multilayer deposition have advanced tunability of network structure towards the target separation, the methodology is mostly applicable to forming membranes directed to the separation of ionic species. The molecular level separation of neutral substances is still limited. The reason is that the starting entities used to synthesize LbL layers maintain their structure to a limited extent during the reaction, leading to a limited correlation between reactants and product's structure. This general lack of control over the structure of the separation layer produced is inherent to traditional synthetic methods in general and is directly related to the fact that the starting entities do not maintain their structure during the reaction, leading to a poor correlation between reactants and the product structure. A new class of organic porous materials based on covalent organic frameworks (COF) with a stable tunable pore size has been developed recently that overcomes this limitation (Ref. Christian S. Diercks and Omar M. Yaghi, "The atom, the molecule, and the covalent organic framework", Science, (2017), V. 355, issue 6328, p. 923).

Covalent organic frameworks (COFs) are a class of porous organic polymers with a permanent porosity and highly ordered structures (Ref. Shuai Cao et al., "Design and synthesis of covalent organic frameworks towards energy and environment fields", Chemical Engineering Journal, (2019), V. 355, p. 602-623; Rakesh Kumar Sharma et a., "Recent Development of Covalent Organic Frameworks (COFs): Synthesis and Catalytic (Organic-Electro-Photo) Applications", Materials-Horizons, (2020), V.7, issue 2, p. 411-454). Unlike other polymers, a significant feature of COFs is that their structure is predesigned, synthetically controlled, and functionally managed. The reason is that the starting entities to synthesize COFs maintain their structure during the reaction, leading to a good correlation between reactants and the product structure. The design of an extended network that will maintain its structural integrity throughout the construction process can be realized by starting with well-defined and rigid molecular building blocks. The function of a COF arises from its porosity and molecular skeletons. As porous materials with a pre-designed structure, COFs have emerged as a new media for gas adsorption and storage. However, current COFs are crystalline porous powders and thus are not adaptable to a membrane configuration. There is thus a need to advance composite membrane preparation methodologies that lead to the formation of COF like separation layers with well-defined pore structure and improved molecular level separation capabilities.

A critical enabling need in the composite membrane preparation by any method, including the LbL process, is the availability of polymeric porous support materials that are chemically and solvent resistant and can withstand exposure to high temperatures and high differential pressures. Furthermore, the polymeric substrate must exhibit a high surface porosity and uniform pore size distribution with an average pore size in the 10 to 100 nm range. This surface morphology is critical to form ultra-thin separation layers that can withstand high differential pressures while simultaneously providing minimal resistance to the fluid flow. To enable the covalent attachment of the composite layer to the substrate's surface, the surface of the porous polymeric support must be further amenable to a chemical modification with functional groups that serve as seeding points for the initiation of the LbL process. The chemical functionalization must be both robust and versatile to form a high concentration of functional groups without affecting surface pore morphology.

LbL deposition methodologies to form composite membranes have been limited to the application of LbL methodology to known and available polymeric substrates, which are almost universally formed by solution-based casting methods. The polymer-based substrates used to date have inherent limitations that preclude development of robust and tailored membranes via construction of covalent organic porous framework separation layers on top of a porous support due to the limited solvent resistance of the substrate. It is desirable to develop porous substrate media that exhibits prerequisite attributes required for the preparation of covalent organic framework separation layers. It is further desired to have a diverse media configuration to enable fabrication of membrane devices, such as flat sheet, hollow fiber or monolith configurations, and to manufacture the shaped media from thermoplastic polymers by standard commercial melt processing methodologies. Thus, there is still a need in the art to overcome the shortcomings of prior art methods and to develop a new methodology for the preparation of composite membranes by forming covalent organic frameworks by the LbL process on solvent resistant porous supports and to develop a new porous support media tailored towards the LbL process.

Poly (aryl ether ketone)s (PAEKs) represent a class of semi-crystalline engineering thermoplastics with outstanding thermal properties and chemical resistance. One of the representative polymers in this class is poly (ether ether ketone) (PEEK), which has a reported continuous service temperature of approximately 250° C. PAEK polymers are virtually insoluble in all common solvents at room temperature. These properties make PAEK attractive materials for porous membrane preparation. However, the intractability of PAEK makes preparation of membranes with controlled porosity exceedingly difficult. Current membrane substrate media is prepared by solution-based processes. Semi-crystalline PAEK materials are insoluble in common solvents. PAEK polymers can be chemically modified to impart solubility, for example, by sulfonation. However, articles formed from such functionalized PAEK polymers lose many of the desired properties. Bulk modification leads to a disruption in the ability of the polymer chain to crystallize and articles subsequently formed from such functionalized polymers lose solvent resistance and much of their thermomechanical properties.

Preparation of porous materials from poly (aryl ether ketones) has been largely limited to the family member poly (ether ether ketone) (PEEK). Furthermore, development of porous PEEK materials was limited to membrane applications almost exclusively. A number of methods to prepare porous PEEK membranes have been disclosed in the art. It is known to prepare porous PEEK membranes from solutions of strong acids, such as concentrated sulfuric acid. However, PEEK can undergo sulfonation in the concentrated sulfuric acid media and thus can lose some of its desirable sought-after properties. U.S. Pat. No. 6,017,455 discloses preparation of non-sulfonated porous PEEK membranes from concentrated sulfuric acid solvents sufficiently diluted by water to prevent sulfonation. The membranes are formed by casting PEEK solution to form a film followed by coagulation in a concentrated sulfuric acid. This membrane preparation process is complicated and produces large amounts of waste acid.

U.S. Pat. No. 5,997,741 discloses preparation of porous PEEK membranes by forming a solution of PEEK polymer in a concentrated sulfuric acid at the temperature of 15° C. or lower to prevent sulfonation. The solution is processed and cast at a sub ambient temperature, followed by coagulation in water or in a concentrated sulfuric acid. Only dilute PEEK solutions can be formed in the concentrated sulfuric acid, which adversely affects film forming characteristics, the mechanical characteristics, and the pore morphology of the thus formed porous PEEK membranes.

U.S. Pat. Nos. 4,992,485 and 5,089,192 disclose preparation of porous PEEK membranes from non-sulfonating acid solvents, which include methane sulfonic acid and trifluoromethane sulfonic acid. European Patent Specification EP 0737506 discloses preparation of improved polymeric membranes based on PEEK admixtures with polyethylene terephthalate. The membranes are formed by the solution casting process from a methane sulfuric acid/sulfuric acid solvent mixture.

The acid based solvent systems for manufacture of porous PEEK membranes disclosed in the art are highly corrosive, frequently toxic and generate substantial environmental and disposal problems. For these and other reasons, the acid-based casting processes have found limited commercial use.

An alternative to the acid based solvent system for PEEK membrane preparation involves the use of high boiling point solvents and plasticizers that dissolve PEEK polymer at elevated temperatures. U.S. Pat. Nos. 4,957,817 and 5,064,580, both issued to Dow Chemical Co., disclose preparation of porous PEEK articles from its admixture with organic polar solvents having a boiling point in the range of 191° C. to 380° C., such as benzophenone and 1-chloronaphthalene, and organic plasticizers capable of dissolving at least 10 weight percent of PEEK, respectively. The final porous article is formed by removing the organic polar solvents and/or plasticizers by dissolution into a low boiling temperature solvent. U.S. Pat. No. 5,200,078 discloses preparation of microporous PEEK membranes from its mixtures with plasticizers wherein the membrane undergoes a drawing step prior to or after the plasticizer is removed by leaching. U.S. Pat. No. 5,227,101 issued to Dow Chemical Co. discloses preparation of microporous membranes from poly(aryl ether ketone) type polymer by forming a mixture of PEEK type polymer, a low melting point crystallizable polymer, and a plasticizer, heating the resulting mixture, extruding or casting the mixture into a membrane, quenching or coagulating the membrane and leaching the pore forming components. U.S. Pat. No. 5,205,968, issued to Dow Chemical Co., discloses preparation of microporous membranes from a blend containing a poly (aryl ether ketone) type polymer, an amorphous polymer and a solvent.

M. F. Sonnenschein in the article entitled "Hollow fiber microfiltration membranes from poly (ether ether ketone)", published in the Journal of Applied Polymer Science, Volume 72, pages 175-181, 1999, describes preparation of PEEK hollow fiber membranes by a thermal phase inversion process. The use of a leachable additive polymer, such as polysulfone, is proposed to enhance membrane performance. Preparation of porous PEEK membranes by coextrusion of PEEK with polysulfone polymers followed by the dissolution of the polysulfone polymer from the interpenetrating network is disclosed in European Patent Application Publication EP 409416 A2.

It is also known in the art to prepare porous PEEK membranes from its blends with a compatible poly (ether imide) polymer (PEI). Preparation of such membranes is described by R. S. Dubrow and M. F. Froix in U.S. Pat. No. 4,721,732 and by R. H. Mehta et al. in an article entitled "Microporous membranes based on poly(ether ether ketone) via thermally induced phase separation", published in the Journal of Membrane Science, Volume 107, pages 93-106, 1995. The porous structure of these PEEK membranes is formed by leaching the poly (ether imide) component with an appropriate strong solvent, such as dimethylformamide. However, as described by Mehta et al., the quantitative removal of PEI component by leaching is essentially impossible which in turn can lead to an inferior porous structure.

Japan Kokai Tokkyo Koho 91273038 assigned to Sumitomo Electric Industries, Ltd., discloses preparation of porous PEEK membranes by an ion track etching method.

M. L. Bailey et al. in U.S. Pat. No. 5,651,931, describe a sintering process for the preparation of biocompatible filters, including PEEK filters. The filters are formed from a PEEK powder of a pre-selected average particle size by first pressing the powder into a "cake" followed by sintering in an oven or furnace. The process is limited to preparation of filters with a relatively large pore size and a broad pore size distribution and does not provide economic means of forming large membrane area fluid separation devices.

A process for preparation of porous PAEK articles that preserves the desirable thermal and chemical characteristics of PAEK polymers has been disclosed in U.S. Pat. No. 6,887,408. The porous articles are prepared from PAEK blends with compatible polyimides. An article of targeted shape is formed from the PAEK/polyimide blend by melt processing followed by removal of the polyimide phase by reaction with a primary amine. The method enables preparation of shaped porous PEEK articles, including hollow fibers membranes. Preparation of such hollow fiber membranes is described by Yong Ding and Ben Bikson in article entitled "Preparation and characterization of semi-crystalline poly (ether ether ketone) hollow fiber membranes", published in the Journal of Membrane Science, volume 357 (2010), p. 192-198. Preparation of hollow fiber membranes by this methodology is further described by Gong Chen, Yuan Chen, et al., in the article entitled "Pore Structure and Properties of PEEK Hollow Fiber Membranes: Influence of the Phase Structure Evolution of PEEK/PEI Composite", Polymers, Volume 11 (2019), p. 1398.

D. Morrisette and P. Croteu, in PCT application, International Publication Number WO 2007/051309, disclose porous PEEK material suitable for medical implant devices. The porous material is formed by mixing dissolvable material with PEEK in a molten form and subsequently removing the dissolvable material. The disclosed dissolvable material is a salt. The method capable of forming PEEK materials with very large pore size and irregular pore structure.

M. C. Iliuta et al., in U.S. Pat. No. 9,908,985, disclose the preparation of microporous hydrophobic polymeric hollow fibers. The hollow fibers are prepared by melt processing from a mixture of polymer with micron-size NaCl particles followed by salt dissolution. The hollow fiber is reported to be non-wetting and useful for gas transfer contacting applications.

Poly (aryl ether ketone)s are high-performance engineering polymers that exhibit exceptional thermal and chemical characteristics and are thus highly sought after as porous membranes and membrane substrates for separation applications that require solvent and thermal resistance. However, the properties that make PAEK polymers desirable also make the preparation of porous media difficult. The chemical resistance of PAEK polymers enables chemical modification of preformed polymer article's surfaces without alteration of the underlying shape of the article.

PEEK and PAEK polymers in general are insoluble in all common organic solvents and this insolubility prohibits the direct application of many ordinary organic synthetic methods, such as chloromethylation. The modification of PAEK polymers is thus difficult. For example, bulk modification of PEEK polymer was mainly limited to the sulfonation of PEEK due to the insolubility of PEEK in ordinary organic solvents. The sulfonation of poly (aryl ether ketone polymers) PEEK and PEK is well known in the literature. It can be carried out using sulfuric acid, a mixture of sulfuric acid with methane sulphonic acid, a mixture of sulfuric acid and oleum, sulfur trioxide-triethyl phosphate complex, and chlorosulfonic acid. The bulk PEEK sulfonation is described by Ulrich H. H. et al., "Sulfonated poly(aryl ether ketone)s," Die Angewandte Makromolekulare Chemie 1998, 263(1), 71-78.

A number of techniques have been used in art to chemically modify the surface of dense PEEK materials to affect surface characteristics, such as friction, wettability, adsorption and adhesion, including cell adhesion. PEEK films surface-functionalized with hydroxyl, amino, fluorine, and carboxyl groups are reported as substrates for the cultivation of mammalian cells by Olivier Noiset, et al., in "Surface modification of poly(aryl ether ether ketone) (PEEK) film by covalent coupling of amines and amino acids through a spacer arm," Journal of Polymer Science Part A: Polymer Chemistry 1997, 35(17), 3779-3790. The PEEK polymer is reported as a biocompatible, non-toxic, and biologically inert material in the field of medical engineering by Morrison, C. et al. in "In vitro biocompatibility testing of polymers for orthopedic implants using cultured fibroblasts and osteoblasts," Biomaterials 1995, 16(13), 987-992.

Surfaces of dense PEEK polymer in the film form are modified via carbonyl groups by using the surface wet chemistry (organic reactions carried out at the solid-liquid interface). Surface hydroxylated PEEK (PEEK-OH) films with up to 75-85% degree of surface functionalization have been synthesized by selective carbonyl reduction using a stirred solution of NaBH4 in DMSO solvent at 120° C. References: Noiset, O. et al., "Surface reduction of poly(aryl ether ether ketone) film: UV spectrophotometric, 3H radiochemical, and x-ray photoelectron spectroscopic assays of the hydroxyl functions," Macromolecules 1997, 30(3), 540-548; and Diez-Pascual, A. et al., "Synthesis and characterization of poly(ether ether ketone) derivatives obtained by carbonyl reduction," Macromolecules 2009, 42(18), 6885-6892. The reduced hydroxylated PEEK serves as a key intermediate in the synthesis of fluorinated, carboxylated, amine-functionalized, and several other surface modifications of PEEK films. References: Marchand-Brynaert J. et al., "Surface fluorination of PEEK film by selective wet-chemistry," Polymer 1997, 38(6), 1387-1394: Henneuse, C. et al., "Surface carboxylation of PEEK film by selective wet-chemistry," Polymer 1998, 39(4), 835-844.126; and Henneuse-Boxus C. et al. "Surface amination of PEEK film by selective wet-chemistry," Polymer 1998, 39(22), 5359-5369.

O. Noiset, et al. have modified the PEEK film surface using a wet-chemistry technique by selectively reducing ketone groups to form hydroxyl groups (Macromolecules, volume 30, p. 540-548, 1997) and then covalently fixing hexamethylene diisocyanate by addition onto the hydroxyl function (Journal of Polymer Science, Part A, Vol. 35, pages 3779-3790, 1997). The hexamethylene diisocyanate modified PEEK film was subsequently modified to attach amines and amino acids, thus modifying film surfaces to be used for cell growth.

C. Henneuse-Boxus, et al. have modified PEEK film surfaces using photochemical routes (European polymer Journal, Vol. 37, pages 9-18, 2001) and attached fluorescent probes to PEEK film surfaces (Polymer, Vol 41, pages 2339-2348, 2000). P. Laurens, et al., have modified PEEK surfaces with excimer laser radiation (Applied Surface Science, Vol. 138-139, pages 93-96, 1999). N. Frauchina and T. McCarthy have modified semi-crystalline PEEK films with carbonyl-selective reagents to induce surface functionality (Macromolecules, Vol. 24, pages 3045-3049, surface-modified films were robust and unaffected by a variety of solvents. In U.S. Pat. No. 5,260,415, I. David disclosed a process for the crosslinking of polymer containing diaryl ketone groups by heating the polymer with alcohol and/or alkoxide to enhance chemical resistance.

Preparation of composite perfluoro-hydrocarbon membranes by surface modification and surface coating of porous PEEK is disclosed in U.S. Pat. Nos. 9,610,547 and 10,376,846. The super-hydrophobic properties of disclosed membranes enable a range of gas and vapor separations. Preparation of surface-functionalized porous PEEK materials is disclosed in U.S. Pat. No. 7,176,273. Tailored functionalization imparted hydrophilic or hydrophobic properties to these materials. The use of these functionalized PEEK materials for membrane gas separation and nanofiltration has been further disclosed.

The preparation of porous PAEK materials for membrane applications has been disclosed in the art. The use of functionalized poly (aryl ether ketone) materials as substrates for the preparation of composite membranes by LbL synthesis method is unknown. It was found surprisingly that functionalized porous semi-crystalline poly (aryl ether ketones) substrates enable the preparation of high-performance composite membranes by the LbL methodology.

SUMMARY OF THE INVENTION

Disclosed is the preparation of composite membranes with covalent organic framework separation layers. These membranes are formed by a reticulate layer by layer synthesis to form a covalent organic framework separation layer on top of a functionalized porous poly (aryl ether ketone) (PAEK) polymer substrate. The separation layer is covalently attached to the functionalized porous PAEK substrate via surface functional groups. The use of composite fluid separation membranes is further disclosed. The preferred PAEK polymers include poly (ether ether ketone), poly (ether ketone ketone), poly (ether ketone ether ketone ketone), and poly (ether ketone).

Multi-dimensional polymer framework separation layers are formed on PAEK substrates by a controlled directional synthesis initiated from the substrate's surface and driven by the formation of covalent linkages between the substrate, PAEK polymer, and the reaction medium. Very thin separation layers, often monomolecular layers, are produced. Repetitive deposition steps provide precise control over the total thickness and structure of the separation layer. The separation layer thickness can range from a few angstroms up to the micrometer range. The step-by-step procedure allows for a fine framework structure in three dimensions. The separation layer framework structure can further contain functional groups. Diverse three-dimensional morphologies can range from a homogeneous separation layer to an asymmetric layer with gratings, gradients, or steps of defined height in molecular dimensions and interstitial pore size.

Covalent organic framework (COF) layers are constructed by the reticulate layer by layer (LbL) synthetic method from rigid, semi-rigid, or flexible organic building units with varying structural configurations. Polymeric frameworks of controlled special configuration are formed, such as three-dimensional (3D) separation layers, in accordance with the building unit dimensions that can be the same or can differ in each consecutive layer (LbL step). The layer structure and functionality are tailored toward applications.

A surface grafted and/or crosslinked polymeric network is formed by the LbL technique during successive exposures of the functionalized surface of the substrate to multifunctional monomers that react via the formation of covalent bonds with the initial surface and in subsequent steps with the preformed preceding layer. The method prevents uncontrolled polymerization by limiting reaction sites to surface-bound moieties. The layers are grown on the functionalized poly (aryl ether ketone) substrate, which presents a high density of chemical groups reactive to the functionality of the initial monomer.

The use of multifunctional monomers in a sequential LbL deposition process leads to the formation of a covalent organic framework layer (COF). A topology diagram can be applied to design the skeleton and the pore size of COF layers to direct the formation of the skeleton, which is based on the geometry of building units. A COF framework consists of two building modules: molecular units that form the skeleton as linkers (building units) and covalent linkages (bonds formed between those units upon reticulation). The modules control both the pore size and functionality. This topology design principle constitutes the basis of the COF framework construction on a PAEK substrate's surface. To attain a stable and defined structure, the building units must possess specific geometries and preferably rigid structures. The PAEK functionalized surface provides seeding to molecular building blocks to enable the synthesis of COF to proceed based on the reticulation of these building units. The units are joined together into an extended framework.

The separation layer of the composite membrane is formed via reaction of the following components: (a) functional groups on the PAEK surface, (b) multifunctional monomer A, and (c) multifunctional monomer B. Additional layers are formed by the reticulate synthesis of the same initial monomers or are constructed by a combination of different monomers. In some embodiments, both monomers can be a mixture of monomers and are applied from solutions by a wet chemistry LbL process. The multifunctional monomer A has a general formula $R(X)_n$, wherein R is an organic moiety selected from aromatic, aliphatic, alicyclic, or heterocyclic groups and combinations thereof; X is a functional group selected from the primary or secondary amino group, carboxyl group, acid chloride group, hydroxyl group, mercapto group, aldehyde group, epoxy group or isocyanate group; n represents an integer of 2 or more, 2 to 8 or 2 to 4. In some embodiments, the functional group is part of the heterocyclic radical. The multifunctional monomer B has a general formula $R'(Y)_n$, wherein R' is an organic moiety selected from aromatic, aliphatic, alicyclic or heterocyclic groups and combinations thereof; Y is a functional group selected from the primary or secondary amino group, carboxylic group, acid chloride group, hydroxyl group, mercapto group, aldehyde group, epoxy group or isocyanate group; n represents an integer of 2 or more, 2 to 8 or 2 to 4. In some embodiments, the functional group is part of the heterocyclic radical.

The functional groups of the substrate, the monomer A and the monomer B are selected to form covalent bonds in a reticular layer by layer synthesis. In a most common embodiment, the PAEK surface is functionalized with primary amino groups and the monomer A contains acid chloride functional groups, —COCl, and the monomer B contains primary or secondary amino groups, —$NH_2$, =NH; alternatively, the PAEK surface is functionalized with hydroxyl functional groups and the monomer A contains epoxy-functional groups, and the monomer B contains primary or secondary amino groups, —$NH_2$, =NH or hydroxyl groups.

In preferred embodiments, the PAEK substrate exhibits an asymmetric pore structure with smaller size surface pores in the mesoporous pore size range. The substrate is semi-crystalline and prepared from blends of PAEK polymers with pore-forming materials. A solid (non-porous) precursor of the desired shape is formed first from a PAEK polymer blend with a pore-forming material by melt processing or solution-based methods. The desired shape may include a film, a frit, a hollow fiber, or a monolith. The initial precursor solid PAEK article is amorphous and converted to a semi-crystalline state in subsequent processing steps. The substrate is converted into a porous membrane by removing the pore-forming material. The functionalization of the substrate followed by the formation of the composite separation layer is carried out by a number of different embodiments.

Principle schemes of forming composite organic framework separation layers on top of the poly (aryl ether ketone) substrate by the LbL synthesis are summarized in FIG. 1. Schemes IA, IB and IC disclose hierarchical processes of forming composite PAEK membranes wherein the composite layer is formed on a preformed porous substrate in different stages of membrane preparation: (A) Amorphous PAEK non-porous precursor is formed, the surface of the amorphous non-porous precursor substrate is functionalized, the precursor is converted into a semi-crystalline form, the pore-forming material is removed, and the initial composite layer is formed by the LbL process, optionally an additional composite layer is formed by the LbL process, and optionally an additional antifouling layer is deposited, (B) Amorphous PAEK non-porous precursor is formed, the precursor is converted into a semi-crystalline form, the pore-forming material is removed, the surface of the amorphous porous precursor substrate is functionalized, and the initial composite layer is formed by the LbL process, optionally an additional composite layer is formed by the LbL process, and optionally an additional antifouling layer is deposited, (C) Amorphous PAEK non-porous precursor is formed, the precursor is converted into a semi-crystalline form, the surface of the amorphous non-porous precursor substrate is functionalized, the pore-forming material is removed, and the initial composite layer is formed by the LbL process, optionally an additional composite layer is formed by the LbL process, and optionally an additional antifouling layer is deposited.

Schemes IIA, and IIB disclose hierarchical process of forming composite PAEK membranes, wherein the composite layer is formed on a non-porous precursor substrate in different stages of membrane preparation followed by conversion into a porous membrane: (A) Amorphous PAEK non-porous precursor is formed, the surface of the amorphous non-porous precursor substrate is functionalized, the initial composite layer is formed by the LbL process, the precursor is converted into a semi-crystalline form and the pore-forming material is removed, optionally an additional composite layer is formed by the LbL process, and optionally an additional antifouling layer is deposited, (B) Amorphous PAEK non-porous precursor is formed, the precursor is converted into a semi-crystalline form, the surface of the amorphous non-porous precursor substrate is functionalized, the initial composite layer is formed by the LbL process, and the pore-forming material is removed, optionally an additional composite layer is formed by the LbL process, and optionally an additional antifouling layer is deposited.

In one embodiment of this invention, the surface functional groups are formed by a wet-chemical surface modification of the pre-formed porous PAEK substrate. The PAEK substrate's surface is modified with amino, carboxyl, acid chloride, aldehyde, isocyanate, mercapto, or hydroxyl functional groups. The functionalized porous PAEK substrate is then used to react with a multi-functional monomer in the first step of the LbL process. The functionalized PAEK substrate can be used directly to react with multi-functional monomers in the LbL process. Alternatively, a brush extender group can be attached to the PAEK substrate first. The brush extender groups form a fluid permeable interim layer and provide a gutter-like function for fluid flow into the surface pores of the substrate. The brush extenders include low molecular weight hydrocarbons, oligomers or polymers containing functional groups, such as epoxy groups or primary amino-groups ~$NH_2$, wherein one set of functional groups is used to attach the brush to a poly (aryl ether ketone) surface and another set of functional groups is used for the LbL synthetic process. The attachment of the first targeted multi-functional molecule in the LbL synthesis to the substrate is thus carried out utilizing functional groups in the brush extender molecule's backbone.

In another embodiment of this invention, the surface functional groups are formed by a wet-chemical surface modification of the dense non-porous PAEK precursor substrate prior to the removal of the pore-forming material. After the surface of the precursor is functionalized with target functional groups the pore-forming material is removed to form a surface-functionalized porous PAEK substrate. Such substrates are particularly ideal to form composite membranes by LbL process with a non-occlusive composite separation layer. The PAEK substrate surface is modified with amino, carboxyl, acid chloride, aldehyde, isocyanate, mercapto, or hydroxyl groups. Surface functionalized with hydroxy, epoxy and amino groups is particularly preferred for the LbL method of this invention. The functionalized porous PAEK substrate is then used to react with a multi-functional monomer in the first step of the LbL process. The functionalized PAEK substrate can be used directly to react with multi-functional monomers in the LbL process. Alternatively, a brush extender group can be attached to the PAEK substrate first. The brush extender groups form a fluid permeable interim layer and provide a gutter-like function for fluid flow into the surface pores of the substrate. The brush extenders include low molecular weight hydrocarbons, oligomers, or polymers containing functional groups, such as primary amino-groups ~$NH_2$, wherein one set of functional groups is used to attach the brush to a poly (aryl ether ketone) surface and another set of functional groups is used for the LbL synthetic process. The attachment of the first targeted multi-functional molecule in the LbL synthesis to the substrate is thus carried out utilizing functional groups in the brush extender molecule's backbone.

To form an ultra-thin composite separation layer by LbL method it is desirable to limit the surface functionalization and the subsequent composite layer deposition to the exterior surface of the substrate article only. Furthermore, it is desirable for the substrate to exhibit an asymmetric pore morphology (small mesopore size surface pores and larger diameter interior pores). This desired membrane configuration is accomplished by the detailed method comprised of the following steps: (a) forming a blend of a poly (aryl ether ketone) polymer with a polyimide (polyimide serves as a pore forming material); (b) forming a shaped article from the blend by melt processing, wherein the article is substantially amorphous (the preferred article configuration is hollow fiber); (c) subjecting the surface of the article to a solvent treatment step that induces crystallization in the surface of the article to a predetermined depth; (d) subjecting the article to a thermal annealing step to complete crystallization; (e) introducing functional groups on the surface of the article via reaction with benzophenone segments of a polymeric backbone of the polymer; (f) bringing the article into contact with a strong inorganic base, primary amine or hydrazine to affect the decomposition of the polyimide; (g) removing products of the polyimide decomposition to form a porous surface functionalized article; and (h) forming a separation layer on the surface of functionalized porous article covalently attached to the surface of the porous article by a layer-by-layer synthesis. The above method provides for the formation of an asymmetric porous surface-functionalized PAEK substrate prior to composite layer formation by the LbL process.

Another method of forming the composite membrane with the desired asymmetric substrate pore configuration is accomplished by the method comprised of the following steps: (a) forming a blend of a poly (aryl ether ketone) polymer with a polyimide (the polyimide serves as the pore forming material); (b) forming a shaped article from the blend by melt processing, wherein the article is non-porous and substantially amorphous (the preferred article configuration is hollow fiber); (c) subjecting a surface of the article to a solvent treatment step that induces crystallization in the surface of the article to a predetermined depth; (d) subjecting the article to a thermal annealing step to complete crystallization; (e) introducing functional groups on the surface of the article via reaction with benzophenone segments of a polymeric backbone of the polymer; (f) forming a separation layer on the surface of functionalized non-porous article covalently attached to the surface of the porous article by a layer-by-layer synthesis; (g) bringing the article into contact with a strong inorganic base, a primary amine or hydrazine to affect the decomposition of the polyimide; (h) removing products of polyimide decomposition from the article; and (i) recovering the composite membrane. The method also provides for the formation of a composite membrane on an asymmetric PAEK substrate but via a change in the sequence of steps. The surface functionalization and LbL composite layer formation take place on the surface of a non-porous precursor. The formation of the final porous interior structure takes place in the subsequent step following composite layer formation.

The PAEK substrate used to form composite membranes of this invention preferably are asymmetric with a mesoporous surface pore structure with a narrow pore size distribution and average surface pore size between 10 and 100 nanometers. The substrate is pre-shaped as a film, a hollow fiber, frit, or a monolith. In some embodiments, the mesoporous surface exhibits a bimodal pore size distribution. The bimodal distribution consists of a mesoporous pore fraction with an average pore size below 100 nanometers and a microporous pore fraction with an average pore size above 0.5 microns.

In some embodiments, the functionalized porous poly (aryl ether ketone) substrate is prepared by a process comprising the steps of: (a) forming a blend of poly(aryl ether ketone) polymer with a polyimide; (b) forming a shaped substantially amorphous article from the blend by melt processing; (c) subjecting the shaped article to a sequence of solvent treatment followed by a thermal annealing step to crystallize the poly(aryl ether ketone) polymer phase; (d) forming a porous structure throughout the shaped article, while simultaneously functionalizing the surface of the shaped article by bringing the article into contact with a primary amine to simultaneously decompose the polyimide in the shaped article into low molecular weight fragments and to functionalize pore surface, and (e) removing the low molecular weight fragments from the article.

In one preferred method, the porous poly (aryl ether ketone) substrate of this invention is prepared by a method comprising the steps of: (a) forming a blend of poly(aryl ether ketone) type polymer with a polyimide; (b) forming a shaped article from the blend by melt processing; (c) subjecting the shaped article to a sequence of solvent treatment followed by a thermal annealing step to crystallize the poly(aryl ether ketone) polymer phase; (d) bringing the shaped article into contact with a primary amine to affect the decomposition of the polyimide in the shaped article into low molecular weight fragments under conditions that do not cause functionalization of the poly(aryl ether ketone) polymer with the primary amine; (e) removing the low molecular weight fragments from the article; and (f) optionally drying the porous poly(aryl ether ketone) article. The porous PAEK substrate formed by the above-described process is functionalized in a subsequent step with target surface groups. The preformed PAEK precursors are formed into shaped articles that are incorporated into a fluid separation device. The surface functionalization of PAEK substrate and the LbL synthetic process are frequently carried out in situ in the fluid separation device.

In another preferred method, the porous poly (aryl ether ketone) substrate of this invention is prepared by a method comprising the steps of: (a) forming a blend of poly(aryl ether ketone) type polymer with a polyimide; (b) forming a shaped article from the blend by melt processing; (c) subjecting the shaped article to a sequence of solvent treatment followed by a thermal annealing step to crystallize the poly(aryl ether ketone) polymer phase; (d) functionalizing the surface of the dense shaped article; (e) bringing the shaped article into contact with a primary amine to affect the decomposition of the polyimide in the shaped article into low molecular weight fragments under conditions that do not cause functionalization of the poly(aryl ether ketone) polymer with the primary amine; (e) removing the low molecular weight fragments from the article; and (f) optionally drying the porous poly(aryl ether ketone) article. The functionalize porous PAEK substrate formed by the above-described process is used to form composite membranes by LbL process. The shaped PAEK precursors article is preferably in a hollow fiber form and incorporated into a fluid separation device. The surface functionalization of PAEK substrate and the LbL synthetic process can be carried out in situ in the fluid separation device constructed with hollow fibers.

The separation layer is formed by LbL chemistry and is carried out on a surface-functionalized poly (aryl ether ketone) support. The method yields a membrane separation layer designed to have predetermined structures, compositions, and properties. In particular, highly porous frameworks held together by strong covalent bonds are formed. The framework exhibits exceptionally well-defined pore size and the capacity for molecular level separation. The pore metrics can be systematically varied and functionalized. The separation layer is chemically attached to the substrate. This process is central to the ability to achieve a true design of solid-state materials, which is referred to as a reticular synthesis. The reticular synthesis is a process of assembling judiciously designed rigid, semi-rigid, or flexible molecular building blocks into predetermined ordered structures (networks), which are held together by strong covalent bonds. It is different from the retrosynthesis of organic compounds because the structural integrity and special configuration of the building blocks in the reticular synthesis remain unaltered throughout the construction process. The reticulate methodology provides well-defined porous structures with uniform pore sizes ranging from angstroms to nanometers within each layer. A versatile combination of molecular building units forms a regular connective pore structure, and a molecular framework amenable to functionalization.

The reticular synthesis of this invention can be described as the process of assembling judiciously designed molecular building units into predetermined ordered structures (multi-dimensional networks), which are held together by strong covalent bonds. It is different from forming a separation layer by retrosynthesis of organic compounds because the separation layer is formed utilizing the layer-by-layer molecular assembly. Molecular building blocks in each layer can be the same or different which helps to fully realize the benefits of designed porous solid-state frameworks. The number of layers that form the separation layer can vary from 1 to 10 but can be as much as 50. The number of layers and monomer selection for each layer is directed toward the target separation application and includes such factors as desired functionality and molecular weight cut-off. The membranes of this invention contain at least one surface separation layer formed by the LbL method.

The reticular synthesis of the present invention should be distinguished from prior supramolecular assemblies because the framework of building blocks is linked by strong bonds to the porous support. Most self-standing COFs are crystalline porous powders not easily adaptable to membrane configuration. The present invention builds COF networks directly on the surface of the porous support. More specifically, on the surface of a porous poly (aryl ether ketone) material containing surface functional groups. The method enables the preparation of separation membranes with tailored molecular level separation capabilities. A reticular synthesis utilizing layer-by-layer approach wherein secondary building units are used to direct the assembly of ordered frameworks epitomizes the process. Multi-dimensional nets form the separation layer which is covalently attached to the surface of the porous substrate.

In some embodiments, the building blocks should be conformationally rigid and the bond formation direction must be discrete to form a well-defined three-dimensional framework. The framework is a channel structure wherein the channel size is dependent on the size and length of the building blocks. In other embodiments, the individual layer within the framework is assembled from semi-flexible or flexible molecular units. In later embodiments, the molecular weight of the building block can be higher and include oligomers or even polymers.

The composite membranes of this invention separate components of fluid mixtures by selective permeation. The fluid mixture comprised of multiple components is separated into a fraction enriched in at least one component and a fraction depleted of this component. The fluid mixture is contacted with the composite fluid separation membrane while a pressure difference is maintained across the membrane, or in the case of a vapor component, a partial pressure difference is maintained across the membrane. The separation of components of the fluid mixture takes place across the membrane's separation layer formed on the surface of a poly (aryl ether ketone) substrate by layer-by-layer deposition of a polymeric network covalently attached to the poly (aryl ether ketone) substrates' surface. The fraction enriched in at least one component of the fluid mixture and the fraction depleted of this component are generated by preferentially permeating a portion of the fluid mixture through the composite fluid separation membrane.

The composite PAEK membranes of this invention can address a broad range of fluid separation applications, including ultrafiltration (UF), nanofiltration (NF), and reverse osmosis (RO) processes, all well-established applications. Emerging applications, such as organic solvent nanofiltration and the separation and recovery of active pharmaceutical ingredients (APIs), can be further efficiently addressed by the membranes of this invention.

The above and other features of the invention, including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

DETAILED DESCRIPTION OF THE PREFERRED EMBODIMENTS

Figure 1A:
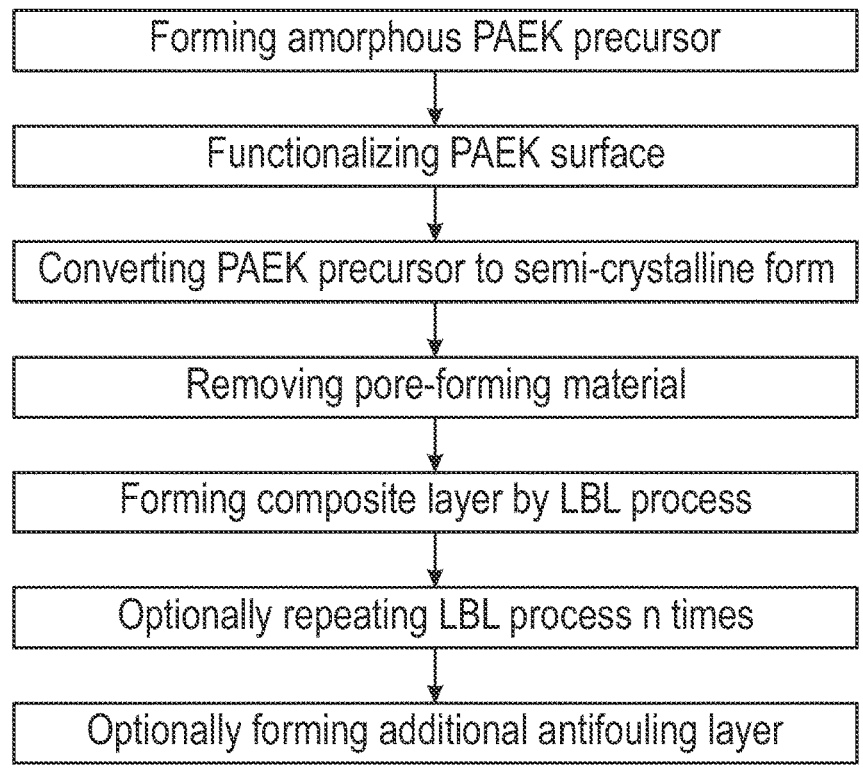
FIGS. 1A-1E illustrate principle schemes of forming the composite organic framework separation layer on the poly (aryl ether ketone) substrate by the LbL synthesis. Hierarchical process steps of forming composite PAEK membranes on a porous PAEK substrate in different stages of substrate preparation are represented in Schemes IA (FIG. 1A), IB (FIG. 1B), and IC (FIG. 1C). Hierarchical process steps of forming composite PAEK membranes on a non-porous PAEK substrate are represented in Schemes IIA (FIG. 1D) and IIB (FIG. 1E) (a composite layer is formed on a non-porous PAEK substrate, and the substrate with the formed composite layer is converted into a porous membrane).
Figure 1B:
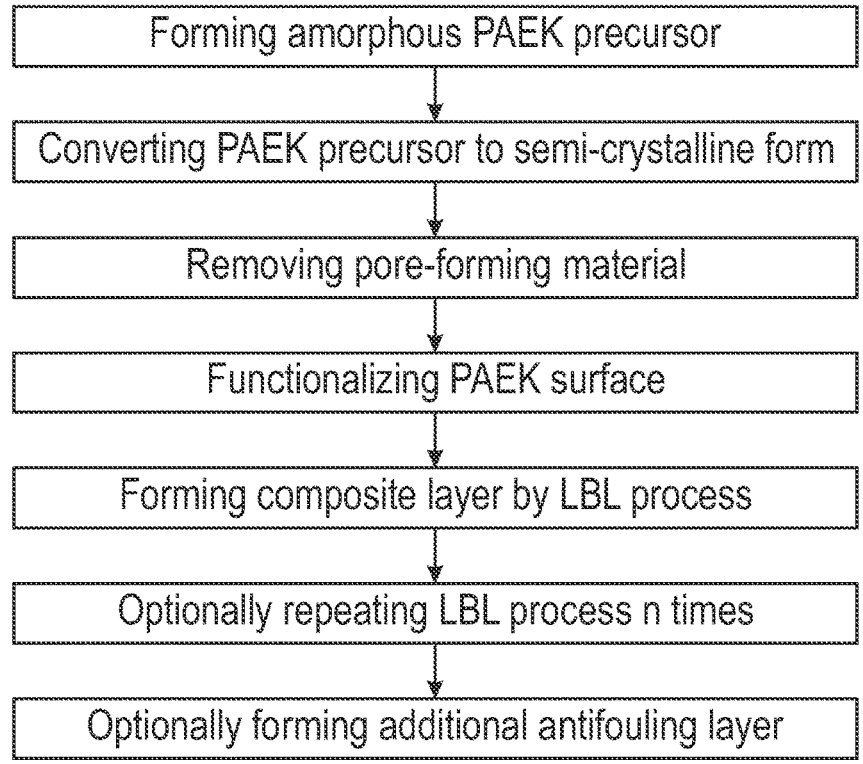
Figure 1C:
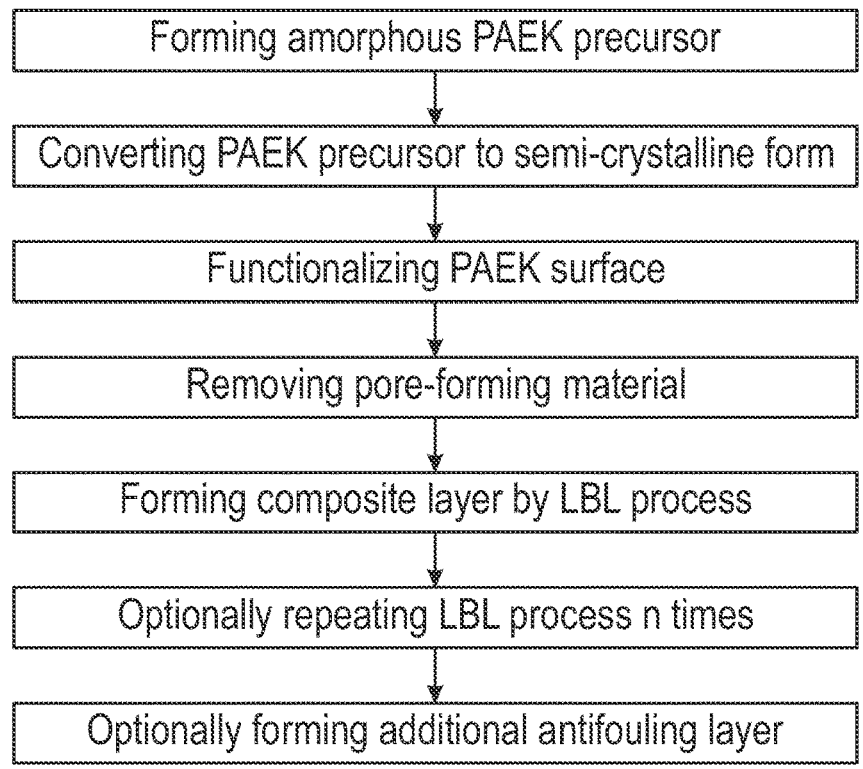
Figure 1D:
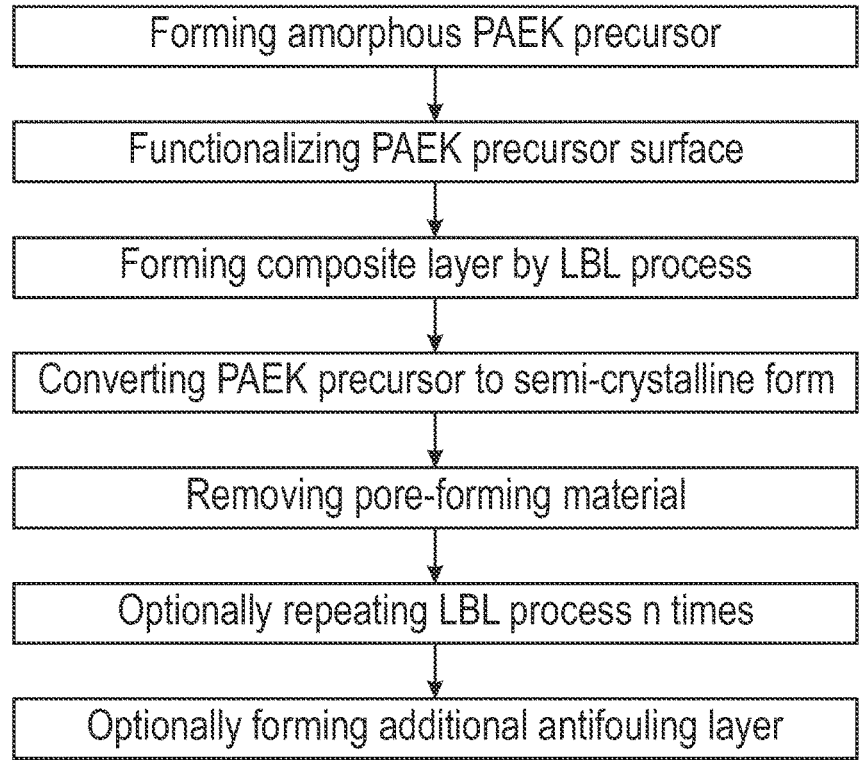

The invention generally relates to composite poly (aryl ketone) membranes, their preparation and their use. The membranes are formed by a reticulate layer by layer synthesis to form a covalent organic framework separation layer on top of a poly (aryl ether ketone) substrate. The separation layer is covalently attached to functional groups on the surface of the porous substrate. Three-dimensional polymer layers are formed on PAEK substrates, by a controlled directional synthesis initiated from the substrate's surface and driven by the formation of covalent linkages between the substrate and the medium. Very thin separation layers, as thin as a monomolecular layer, are produced. Repetitive deposition steps provide precise control over the total thickness and the structure of the separation layer. The separation layer thickness can range from a few angstroms up to the micrometer range. The step-by-step procedure allows for a fine framework structure with controlled surface chemistry and pore size. Diverse three-dimensional morphologies can range from a homogeneous separation layer to an asymmetric layer with gratings, gradients, or steps of defined height in molecular dimensions and interstitial pore size.

Principle schemes of forming the composite organic framework separation layer on the poly (aryl ether ketone) substrate by the LbL synthesis are shown in FIG. 1. Hierarchical process steps of forming composite PAEK membranes on a porous PAEK substrate are represented in Schemes IA (FIG. 1A), IB (FIG. 1B), and IC (FIG. 1C). Hierarchical process steps of forming composite PAEK membranes on a non-porous PAEK substrate are represented in Schemes IIA (FIG. 1D) and IIB (FIG. 1E) (a composite layer is formed on a non-porous PAEK substrate, and the substrate with the formed composite layer is converted into a porous membrane).

Hierarchical processes of forming the composite separation layer on the PAEK substrate as shown in Schemes IA (FIG. 1A), IB (FIG. 1B) and IC (FIG. 1C) can take place on a preformed porous substrate in different stages of substrate preparation: (A) Amorphous PAEK non-porous precursor is formed, the surface of the amorphous non-porous precursor substrate is functionalized, the precursor is converted into a semi-crystalline form, the pore-forming material is removed, and the initial composite layer is formed by the LbL process, optionally additional layers are formed by the reticulate LbL process, and optionally an additional antifouling layer is deposited by LbL process, (B) Amorphous PAEK non-porous precursor is formed, the precursor is converted into a semi-crystalline form, the pore-forming material is removed, the surface of the amorphous porous precursor substrate is functionalized, and the initial composite layer is formed by the LbL process, optionally additional layers are formed by the reticulate LbL process, and optionally an additional antifouling layer is deposited by LbL process, (C) Amorphous PAEK non-porous precursor is formed, the precursor is converted into a semi-crystalline form, the surface of the amorphous non-porous precursor substrate is functionalized, the pore-forming material is removed, and the initial composite layer is formed by the LbL process, optionally additional composite layers are formed by the reticulate LbL process, and optionally an additional antifouling layer is deposited by LbL process.

Figure 1E:
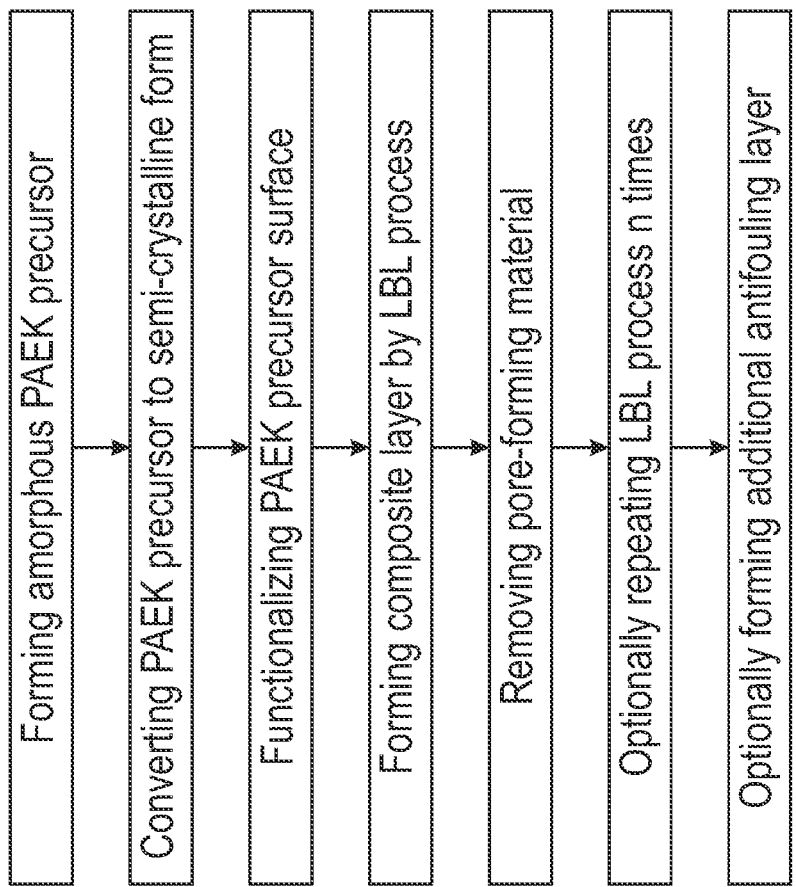

Hierarchical processes of forming composite PAEK membranes on a non-porous precursor substrate are shown in Schemes IIA (FIG. 1D) and IIB (FIG. 1E). The composite layer is formed on the non-porous precursor substrate in different stages of membrane preparation followed by conversion into the porous membrane: (A) Amorphous PAEK non-porous precursor is formed, the surface of the amorphous non-porous precursor substrate is functionalized, the initial composite layer is formed by the LbL process, the precursor is converted into a semi-crystalline form and the pore-forming material is removed, optionally additional layers are formed by the reticulate LbL process, and optionally an additional antifouling layer is deposited by the LbL process, (B) Amorphous PAEK non-porous precursor is formed, the precursor is converted into a semi-crystalline form, the surface of the amorphous non-porous precursor substrate is functionalized, the initial composite layer is formed by the LbL process, and the pore-forming material is removed, optionally additional layers are formed by the reticulate LbL process, and optionally an additional antifouling layer is deposited by the LbL process.

The instant invention provides for a method of separating a fluid mixture into a fraction enriched in a first component and a fraction depleted in the first component, the method comprising the step of contacting the fluid mixture with a fluid separation membrane while maintaining a pressure difference, or in case of a vapor component a partial pressure difference, across the fluid separation membrane, the fluid separation membrane having a separation layer formed on the surface of a porous poly (aryl ether ketone) substrate that has an exterior surface functionalized with reactive functional groups, wherein the separation layer is formed by a layer-by-layer deposition of a polymeric network covalently attached to the poly (aryl ether ketone) substrate via functional groups, whereby the fraction enriched in the first component and the fraction depleted in the first component are generated by preferentially permeating a portion of the fluid mixture through the fluid separation membrane.

The formation of the functionalized PAEK precursor substrate used in the composite membrane preparation by the LbL process can be carried out via a number of embodiments. The PAEK precursor substrate is formed from a blend of poly (aryl ether ketone) polymer with a pore-forming material and the functionalization can be carried out in different stages of substrate preparation: (1) the pore surface of the preformed porous PAEK substrate is functionalized, (2) the surface of a dense PAEK substrate still containing the pore forming material is functionalized followed by the removal of pore forming material, or (3) the pore forming material is initially removed from the thin surface layer of the substrate only, the pore surface of an ultra-thin porous layer of the otherwise dense PAEK precursor is functionalized, and the functionalization step is followed by the removal of pore forming material from the bulk of the porous substrate. Thus, in one of these embodiments, only the extreme exterior layer of the substrate is functionalized: alternatively, in another embodiment, the surface porous layer of a controlled thickness is functionalized: or alternatively, in another embodiment, the entire porous structure of the preformed substrate is functionalized. The preferred pore morphology of the substrate is asymmetric. The preferred method of surface functionalization is via modification of benzophenone segments in the PAEK polymer backbone.

The composite PAEK membrane formed following Scheme IA (FIG. 1A) is prepared as follows: (a) a shaped article is formed from a blend of PAEK polymer with a pore forming material (the article can be in the form of flat sheet material, a hollow fiber, or a monolith, and is substantially amorphous), (b) one of the article's surfaces is modified with functional groups capable of forming covalent bonds with the reactant in the layer by layer synthesis, (c) the article is treated to convert into the desired semi-crystalline form, (d) the article is converted into a porous material by removing the pore forming material to form the porous PAEK support, (e) a separation layer is formed on the functionalized surface of the porous support by the reticulate layer by layer process, and (f) in some embodiments, the reticulate layer by layer process is repeated N times until the desired defect free separation layer of the final organic framework format is formed; (g) in some embodiments, an additional antifouling layer is formed on the surface of the separation layer. The thus formed separation layer is covalently attached to the porous support. The surface functional groups preferably include one of hydroxyl —OH, primary amine —NH$_2$, secondary amine ≈NH, carboxyl —COOH, acid chloride, epoxy, isocyanate, or mercapto —SH groups.

The composite PAEK membrane formed following Scheme IB (FIG. 1B) is prepared as follows: (a) a shaped article is formed from a blend of PAEK polymer with a pore forming material (the article can be in the form of flat sheet material, a hollow fiber or a monolith), (b) the article is treated to convert into the desired semi-crystalline form, (c) the article is processed into the porous material by removing the pore forming material to form the porous PAEK support, (d) the porous support is functionalized with hydroxyl —OH, primary amine —NH$_2$, secondary amine ≈NH, carboxylic —COOH, acid chloride, epoxy, isocyanate or mercapto —SH groups, (e) a separation layer is formed on the functionalized surface of the porous support by the reticulate layer by layer process, and (f) in some embodiments, the reticulate layer by layer process is repeated N times until the desired defect free separation layer of the final organic framework format is formed; (g) in some embodiments, an additional antifouling layer is formed on the surface of the separation layer. The thus formed separation layer is covalently attached to the porous support. In some embodiments, steps (a) and (b) are combined into a single step, wherein the article is fully crystallized as it is being formed by one of injection molding, compression molding or extrusion processes.

The composite PAEK membrane formed following Scheme IC (FIG. 1C) is prepared as follows: (a) a shaped article is formed from a blend of PAEK polymer with a pore forming material (the article can be in the form of flat sheet material, a hollow fiber or a monolith, and is substantially amorphous), (b) the article is treated to convert into the desired semi-crystalline form, (c) one of the article's surfaces is modified with functional groups capable of forming covalent bonds with the reactant in the layer by layer synthesis, (d) the article is converted into a porous material by removing the pore forming material to form the porous PAEK support, (e) a separation layer is formed on the functionalized surface of the porous support by the reticulate layer by layer process, and (f) in some embodiments, the reticulate layer by layer process is repeated N times until the desired defect free separation layer of the final organic framework format is formed; and (g) in some embodiments, an additional antifouling layer is formed on the surface of the separation layer. The thus formed separation layer is covalently attached to the porous support. The surface functional groups preferably include one of hydroxyl —OH, primary amine —NH$_2$, secondary amine ≈NH, carboxyl —COOH, acid chloride, epoxy, isocyanate or mercapto —SH groups.

The composite PAEK membrane formed following Scheme IIA (FIG. 1D) is prepared as follows: (a) a shaped article is formed from a blend of PAEK polymer with a pore forming material (the article can be in the form of flat sheet material, a hollow fiber or a monolith and is substantially amorphous), (b) one of the article's surfaces is functionalized with hydroxyl —OH, primary amine —NH$_2$, secondary amine ≈NH, carboxyl —COOH, acid chloride, epoxy, isocyanate, or mercapto —SH groups, (c) a composite layer is formed on the functionalized surface of the porous support by the layer by layer process, (d) the article is treated to convert into the desired semi-crystalline form, (e) the article is converted into a porous material by removing the pore forming material to form the porous PAEK support, (f) optionally, in some embodiments, the reticulate layer by layer process is repeated N times until the desired defect free separation layer of the final organic framework format is formed; and (g) in some embodiments, an additional antifouling layer is formed on the surface of the separation layer. The thus formed separation layer is covalently attached to the porous support. The article can be crystallized by a solvent-induced crystallization or by a thermal treatment. The sequential treatment by the solvent-induced crystallization followed by the thermal treatment is preferred.

The composite PAEK membrane formed following Scheme IIB (FIG. 1E) is prepared as follows: (a) a shaped article is formed from a blend of PAEK polymer with a pore forming material (the article can be in the form of flat sheet material, a hollow fiber, or a monolith, and is substantially amorphous), (b) the article is treated to convert into the desired semi-crystalline form, (c) one of the article's surfaces is functionalized with hydroxyl —OH, primary amine —NH$_2$, secondary amine ≈NH, carboxyl —COOH, acid chloride, epoxy, isocyanate, or mercapto —SH groups, (d) a composite layer is formed on the functionalized surface of the porous support by the layer by layer process, (e) the article is converted into a porous material by removing the pore forming material to form the porous PAEK support, (f) optionally, in some embodiments, the reticulate layer by layer process is repeated N times until the desired defect free separation layer of the final organic framework format is formed; and (g) in some embodiments, an additional anti-fouling layer is formed on the surface of the separation layer. The thus formed separation layer is covalently attached to the porous support. In some embodiments, steps (a) and (b) are combined into a single step, wherein the article is fully crystallized as it is being formed by one of injection molding, compression molding, or extrusion processes. The pore forming material is removed from the PAEK substrate from the surface juxtaposed to the surface with the composite separation layer.

Substrates used to form composite fluid separation membranes of this invention are formed from poly (aryl ether ketone) polymers (PAEKs). The surface of the PAEK substrate used in composite membrane preparation exhibits a uniform, narrow pore size distribution. The pore size is substantially within the mesoporous size range. A mesoporous material is a material containing pores with diameters between 2 and 50 nm, according to the International Union of Pure and Applied Chemistry (IUPAC) nomenclature. For comparison, IUPAC defines microporous material as a material having pores smaller than 2 nm in diameter and macroporous material as a material having pores larger than 50 nm in diameter. The porous PAEK substrates used for preparation of composite membranes exhibit an average pore diameter between 5 and 100 nm, which is defined herein as being substantially mesoporous or nanoporous. In some embodiments of this invention, the porous structure of the PAEK substrate is composed of structural segments that differ in pore size; this includes porous substrates composed of two or more layers of different pore sizes. The layers can contain mesopores that differ in pore size. The substrate's interior can be composed of mesoporous and macroporous layers or exhibit a bimodal pore distribution that contains mesopores and macropores. Preferably, the substrate pore structure is asymmetric wherein the average interior pore diameter of the substrate is larger than the average diameter of surface pores by a factor of two or more.

The composite membranes used in the fluid separation methods of the present invention are formed using substrates formed from poly (aryl ether ketone) polymers (PAEK). The poly (aryl ether ketone) polymers are defined as polymers containing at least one repeat aryl ether ketone segment in the polymeric backbone. A number of poly (aryl ether ketone) polymers are available commercially including poly (ether ketone), poly (ether ether ketone), poly (ether ketone ketone), poly (ether ether ketone ketone), poly (ether ketone ether ketone ketone) and copolymers collectively referred herein as poly (aryl ether ketones). Poly (aryl ether ketones) have an average molecular weight in the range of 20,000 to 1,000,000 Daltons, typically between 30,000 to 500,000 Daltons.

PAEK substrates used to prepare composite membranes of this invention are preferably semi-crystalline, and are insoluble in common organic solvents at room temperature. Most preferred poly (aryl ether ketones) used to form porous PAEK articles of this invention are poly (ether ether ketone) (PEEK), poly (ether ketone) (PEK), poly (ether ketone ketone) (PEKK), poly (ether ether ketone ketone) (PEEKK), and poly (ether ketone ether ketone ketone) (PEKEKK). A number of poly (aryl ether ketones) are manufactured by Victrex Corporation under the trade names Victrex® PEEK, Victrex® PEEK HT, and Victrex® PEEK ST. Poly (ether ether ketone) is further available from Solvay under trade name KetaSpire™ and another poly (aryl ether ketone) is available from Solvay under the trade name AvaSpire®. Poly (ether ether ketone) is further available from Evonik Corporation under the trade name VESTAKEEP®. The porous PAEK substrates of this invention are semi-crystalline. Namely, a fraction of the poly (aryl ether ketone) polymer phase is crystalline. A high degree of crystallinity is preferred since it imparts solvent resistance and improves the thermo-mechanical characteristics of the membrane. In some embodiments of this invention, the degree of crystallinity is at least 10%, preferably at least 25%, most preferably at least 30%.

The PAEK substrate used in the preparation of composite fluid separation membranes of this invention can be in flat sheet configuration, in the form of a monolith, frit, or in a hollow fiber (micro capillary) configuration wherein membrane exhibits a nanoporous pore surface structure with a narrow pore size distribution and an average surface pore size between 5 and 100 nanometers. The membrane is preferably shaped as a hollow fiber. In some embodiments, the membrane wall structure exhibits a bimodal pore size distribution. The bimodal distribution consists of a mesoporous pore fraction with an average pore size below 100 nanometers and a macro-porous pore fraction with an average pore size above 0.5 microns. It is particularly preferred to form composite PAEK hollow fibers for fluid separation processes utilizing substrates with asymmetric or multi-layer substrate pore wall morphology. Hollow fibers with graded pore structure composed of a thin mesoporous surface layer and macro-porous bulk wall structure exhibit higher solute mass transfer rates while maintaining good stability. Hollow fibers with the layered graded pore structure are formed by coextrusion processes from substrate forming compositions with different contents of pore forming materials. At least one layer of multilayer substrate structure is asymmetric with substantially smaller size surface pores as compared to interior pore size. The surface of asymmetric and/or multilayer PAEK hollow fibers is functionalized via chemical modification. The preferred method of modification is via utilization of the ketone group in benzophenone segments of the polymeric backbone. In the preferred embodiment, the exterior ultra-thin layer only is functionalized via chemical modification of benzophenone segments of the polymeric backbone and used to form a composite PAEK membrane by the LbL process.

The preferred method of forming the functionalized PAEK membrane is utilizing the preformed PAEK substrate. The PAEK substrate is preferably formed by melt processing. The preparation of the porous poly (aryl ether ketone) substrate typically consists of the following steps: (1) Forming a blend of poly (aryl ether ketone) polymer with a pore forming material (porogen) by melt blending (the porogen is alternatively a diluent (a high boiling, low molecular weight liquid or solid), an intermediate molecular weight oligomer, a polymer or a mixture thereof); (2) Forming a shaped article from the blend by melt processing, such as extrusion, injection molding, casting, or molding; (3) Solidifying the shaped article by cooling; (4) Treating the article to affect crystallization of the PAEK polymer component; (5) Removing the porogen (the porogen is typically removed by extraction or reactive extraction); and (6) Drying the porous PAEK substrate.

The crystallization rate of poly (aryl ether ketones) is relatively slow. The crystallization rate of PAEK blends can be further retarded, in particular blends of PAEK polymers with polyimide pore forming materials. At high melt processing conditions such as extrusion, the precursor article is cooled down rapidly. These processing conditions retard crystallization and lead to the formation of a substantially amorphous article. The article formed under the rapidly cooling conditions may be thus substantially amorphous. Substantially amorphous article/substrate is defined as a PAEK article that did not attain a high optimal degree of crystallinity. For fully crystallized solid PAEK polymers, the degree of crystallinity can reach up to 40%, with 35% representing an average desired degree of crystallinity. Substantially amorphous PAEK/blend articles formed by melt processing exhibit a degree of crystallinity below 20%. In preferred embodiments, the PAEK/blend articles exhibit a degree of crystallinity below 5%. The low initial degree of crystallinity enables development of the desired semi-crystalline morphology via the subsequent crystallization steps that may include a sequence of solvent induced crystallization followed by a thermally induced crystallization.

Prior to or subsequent to porogen removal from the substrate, the substrate can be treated to increase the degree of crystallinity of the PAEK phase by a thermal process or via solvent induced crystallization. Both methods are known in the art. The term annealing as defined herein refers to a processing step or condition that leads to an increase in the degree of crystallinity of the PAEK phase. The annealing can take place during the solidification step through the control of cooling rate. For example, the annealing can be carried out in line during the extrusion step by controlling the cooling rate. Alternatively, or in an addition, the annealing can be carried out in a subsequent step after a substantially amorphous article has been formed by rapid solidification. In the latter case, the solidified article can be placed in an oven or transported through a heating zone for a period of time sufficient to affect crystallization. The article can be annealed prior to the removal of the pore forming additive to increase the degree of crystallinity of the PAEK phase at a temperature from about 150° C. to about 330° C., preferably from about 200° C. to about 310° C., most preferably from 250° C. to about 310° C.

The solvent-induced crystallization can be carried out utilizing solvents that affect PAEK polymer crystallization. The solvent treatment can be carried out in alcohol, a ketone, a chlorinated hydrocarbon, polyethylene glycol, an aromatic hydrocarbon, or a mixture thereof. The solvent temperature can greatly affect the rate of crystallization. The combination of treatment temperature and the duration of the treatment can be used to control the depth of solvent-induced crystallization treatment. The use of mild solvents, such as alcohol, is preferred. The alcohols are selected from butanol, ethylene glycol, propylene glycol, isobutyl alcohol, tert-amyl alcohol, cetyl alcohol, pentanol, cyclohexanol, or glycerol. Ketones represent another particularly preferred group of solvents; representative ketones are selected from acetone, methyl ethyl ketone (butanone), 2-hexanone, isophorone, methyl isobutyl ketone, cyclopentanone, acetophenone, valerophenone or pentanone. The solvent treatment can be carried out at an elevated temperature, but preferably below the boiling point of the solvent.

The annealing can take the form of a combination of solvent treatment steps followed by the thermal crystallization step. The crystallization protocol affects the crystalline morphology and crystal size which, in turn, affects pore structure. The pore volume is controlled by PAEK/porogen weight ratio in the blend and can range from 20/80 to 60/40, but preferably the ratio can range between 35/65 and 50/50.

The nanoporous PAEK substrate of this invention preferably has an asymmetric pore structure or a graded pore size distribution across the thickness of the porous wall. It is also within the scope of the invention to have a combination of an asymmetric and graded pore morphology. In one example, the substrate wall is composed of distinct layer regions of variable pore size and/or pore volume. It is preferable to form composite membranes utilizing a porous substrate with graded pore size structure wherein the surface layer exhibits smaller average pore diameter as compared to the interior pore size. One method of forming the multi-layer media of this invention is by coextrusion to form asymmetric pore configurations. Multilayer films or frits can be also formed by compression molding or by calendaring together preformed sheets of variable PAEK composition. The preferred method of forming multilayer substrates is by coextrusion. The method is particularly useful to form multilayer porous hollow fibers. The method provides for preparation of substrates with 2 to 10, preferably 2 to 4, distinct layers of variable blend composition and thus variable pore size and pore volume.

One preferred method of forming an asymmetric PAEK substrate is via the sequential crystallization process of the amorphous precursor. The surface of the shaped substantially amorphous PAEK/blend precursor formed by melt processing is treated initially by contacting with a solvent capable of crystallizing the PAEK polymer phase. The solvent and the treatment conditions are selected to affect the crystallization of the PAEK polymer phase in the article. The crystallization by the solvent treatment is carried out to limit the crystallization to the surface region of the article only. The solvent induced crystallization is diffusion controlled. Thus, the depth/thickness of the surface crystallized region can be controlled by the duration of the treatment and treatment temperature, among other factors. The crystallization proceeds slowly as the solvent diffuses from the surface inwards. The solvent treatment time is controlled to affect surface layer crystallization to a desired depth only. After PAEK polymer in the surface layer of the desired thickness is crystallized, the process is terminated. Solvent induced crystallization provides for a smaller crystal size that, in turn, forms smaller pores following pore forming material removal. The solvent treatment step is followed by thermal annealing to complete the crystallization throughout the entire substrate material. Thermal treatment at high temperatures leads to the formation of larger crystals and thus to larger pores following pore forming material removal. Following the removal of the pore forming material from the crystallized substrate, an asymmetric morphology is formed with a surface layer containing substantially smaller size pores and with an interior composed of larger size pores. In some embodiments, the initial PAEK precursor is a multilayer structure formed by coextrusion of different blend compositions. The sequential crystallization process affects formation of an asymmetric layer in one of graded porosity layers formed by coextrusion.

Pore forming additives (porogens) used in PAEK substrate preparation can include high boiling solvents, compatible oligomers, nanoparticles or compatible or semi-compatible polymers. The use of compatible polymers or their mixtures with partially compatible polymers or nanoparticles as porogens is generally preferred. Preferred polymeric porogens include polysulfones, such as poly (ether sulfone), poly (ether ether sulfone), biphenol based polysulfones and bisphenol A based polysulfone, polycaprolactone, polyimides or mixtures thereof. The nanoparticles are soluble materials that can be organic or inorganic in nature. Inorganic nanoparticles, such as sodium chloride and sodium carbonate, are preferred. The most preferred polymeric porogens are aromatic polyimides. Poly (aryl ether ketone) type polymers form compatible blends with certain aromatic polyimides (PIs). Removal of the polyimide component from such blend articles by solvent extraction, however, can be difficult due to polymer chain entanglement. The polyimide can be quantitatively removed by selective chemical decomposition of the polyimide phase to form the final porous article. This method of porous PAEK material preparation is referred to as the reactive porogen removal process (RPR). In some embodiments, a ternary blend of PAEK/polysulfone/polyimide is utilized.

Polyimides that form a compatible precursor blend with poly (aryl ether ketone) polymers are defined as polymers containing

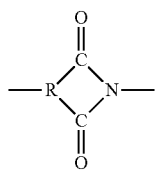

linkages and include aliphatic and aromatic polyimides, copolyimides and polyimide block, and graft copolymers, wherein the polyimide is defined as a molecule that contains at least two imide linkages. Additional polyimides include aromatic polyamide imides, polyhydrazine imides and polyester imides.

Aromatic polyimides are particularly useful for the preparation of porous articles of this invention. The most preferred polyimide is poly (ether imide) (PEI) of the following formula:

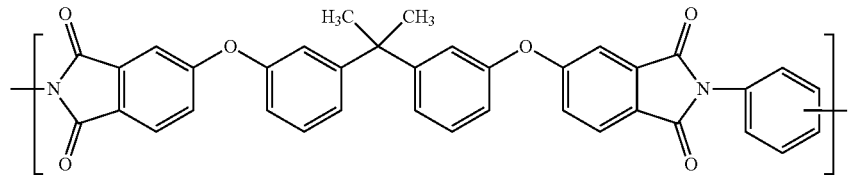

and poly (ether imide) copolymers manufactured by the Sabic Industries under trade names Ultem® 1000, Ultem® XH1010F, Ultem® 6050 and Siltem® STM1500. The copolymers that contain dimethylsiloxane or sulfone units are examples of representative copolymers. Another preferred polyimide is *Aurum*® manufactured by Mitsui and distributed by DuPont Engineering Polymers.

The polyimides can be used as a single additive component or as a mixture of polyimides. The polyimides typically have an average molecular weight in the range of 500 to 1,000,000 Daltons, preferably between 1,000 to 500,000 Daltons.

Mixtures of poly (ether imide) with poly (ether sulfone) (PES), poly (ether ether sulfone) (PEES), or polycaprolactone as well as PEI mixtures with soluble nanoparticles are also within the scope of the present invention. The preferred soluble nanoparticles are salt nanoparticles, such as sodium chloride nanoparticles available from Nanoshel. The additional pore forming components supplement the PE pore forming material and augment pore structures formed from bicomponent PAEK/PEI blends. These supplemental additives are considered compatible PE components. PAEK substrates prepared from blends containing multiple pore forming components exhibit bimodal pore distributions that combine mesopores below 50 nanometer size with macropores above 0.1 micron size. The PAEK substrate with this combination of pore sizes can provide a decrease in pressure drop across the media in the flow through configuration. The PAEK polymer concentrations in blends containing multiple pore forming components range from 20 to 60 percent by weight, while PEI/supplemental compatible component weight ratios in the multi-component blends range from 20/80 to 80/20. Multicomponent compositions formed from blends of PAEK with PEI and nanoparticles exhibit higher fluxes. The concentration of poly (aryl ether ketone) in these multicomponent blend composition ranges from 20 to 60 percent by weight and the nanoparticles weight ratios to the total amount of pore forming materials in the multi component blends range from 20/80 to 80/20.

The formation of the binary poly (aryl ether ketone) blend with the polyimide or multicomponent blends can be carried out by mixing components in a molten stage, such as by melt compounding, and other methods conventionally employed in the polymer compounding industry. The use of a twin extruder is the preferred method of blending. A plasticizer can be optionally added to aid processing. The poly (aryl ether ketone)/polyimide blends form compatible blend compositions. The compatible blend typically exhibits a single glass transition temperature. The compatible composition is defined as capable of forming mesoporous poly (aryl ether ketone) articles with inter-connected pore structure and majority fraction of pore volume having pore diameter in the range of 5 to 100 nanometers. Preferred blends are PEEK/PEI blends that form poly (aryl ether ketone) articles with inter-connected pore structure and an average pore diameter of 50 nm or less. The multicomponent PEEK/PEI/compatible additive blends that form poly (aryl ether ketone) articles with inter-connected pore structure and bimodal pore distribution with combination of meso and macro pores are also preferred. The mesopore diameter is below 50 nanometers while macropore diameter is in the range of 0.1 to 5 micron. The specific membrane separation requirements determine the desired pore size and pore size distribution that, in turn, is determined by PAEK and polyimide selection and by PAEK/PEI ratio. Incorporation of supplementary PEI competitive additives into blend compositions and downstream processing conditions, such as the crystallization protocol, further affect PAEK substrate morphology and can be used to tailor porous structure towards the specific composite membrane preparation.

Blends suitable for preparation of porous substrates in accordance with this invention comprise from about 20 to about 60 weight percent of the poly (aryl ether ketone) polymer component, preferably from about 25 to about 50 weight percent of the poly (aryl ether ketone) component, most preferably from 35 to 50 weight percent.

In addition to the supplemental PEI compatible additive compounds listed above, blends can contain solvents to reduce blend viscosity, stabilizers, pigments, fillers, plasticizers, and the like.

The poly (aryl ether ketone)/polyimide blends can be fabricated into flat sheet film, a hollow fiber, a frit, a monolith or other desired shape precursor substrates by melt extrusion, casting, compression molding or injection molding. The preferred membrane configuration is the hollow fibers. The hollow fiber preferably possesses an outside diameter from about 50 to about 1000 micrometers, more preferably from about 80 to about 500 micrometers, with a wall thickness from about 10 to about 100 micrometers. In the case of films and frits, the media thickness can fall within a broad range, the thickness being limited by the pressure drop for the flow-through process configuration. Flat sheet films may be optionally supported by a non-woven material or by a screen. The article configuration will depend on the intended use. Prior to polyimide phase removal, the article is preferably crystallized to attain the desired degree of crystallinity and crystalline morphology of the PAEK phase. As discussed above, the annealing can take place during the solidification step through control of the cooling rate or by a subsequent combination of solvent-induced crystallization and thermal treatment.

The removal of the polyimide component from the blend can be effectively carried out by the reactive porogen removal process (RPR) utilizing reagents that decompose the polyimide into low molecular weight easily extractable fragments. The suitable classes of reagents include, but are not limited to, strong inorganic bases, ammonia, tetraalkylammonium hydroxides, hydrazine, alkylhydrazines, hydroxyalkylhydrazine, primary aliphatic amines, or secondary aliphatic amines. In some embodiments, the reagent that affects polyimide decomposition is diluted with a solvent and/or contains water. Examples of suitable solvents include alcohols, ketones, hydrocarbons, water, and aprotic solvents, such as NMP, DMF, and the like. Amine reagents suitable to decompose the polyimide phase in accordance with this invention include, but are not limited to, primary and secondary amines, such as methylamine, ethylamine, propylamine, butylamine, ethylenediamine, propylenediamine, butylenediamine, morpholine, piperazine, monoethanolamine, ethylethanolamine, diethanolamine, propanolamine, dipropanolamine, and mixtures thereof. Commercially available amine mixtures, such as Ucarsol®, can be also employed. The preferred amines include hydrazine, monoethanolamine, tetramethylammonium hydroxide, and their mixtures with alcohols, such as methanol, ethanol, isopropanol, or butanol, ketones, water, and aprotic solvents. The most preferred reagents for the decomposition of the polyimide phase are monoethanolamine (MEA), hydrazine and tetramethylammonium hydroxide.

The decomposition and removal of the polyimide component can be carried out at an ambient temperature, but preferably is carried out at elevated temperatures to facilitate the decomposition process and the removal of decomposition products. Preferably, the polyimide decomposition process and the removal of the low molecular weight decomposition product are carried out concurrently in a common solvent media. The comprehensive removal of decomposition products requires additional washing. In one embodiment of this invention, the polyimide decomposition and removal process is carried out at temperature from about 50° C. to about 180° C., preferably from about 80° C. to 150° C. The time required to fully decompose polyimide and to remove products of the decomposition process from the article will depend on the shape, crystalline morphology, the amount of PEI fraction and the thickness of the article as well as process conditions, including reagent concentration, agitation rate, temperature and the like, as will be recognized by those skilled in the art. The thus formed porous poly (aryl ether ketone) article is then washed with an alcohol, water, or other suitable solvent and dried.

In some embodiments, the formation of the porous PAEK substrate and its surface modification are carried out simultaneously. Namely, the reaction can be carried out under conditions that affect both the formation of the porous PAEK article and the modification of the porous PAEK article via ketimine group formation in a single step process, if the porous PAEK article is formed by the RPR process utilizing a primary amine. Carrying out the RPR process at elevated temperatures, preferably above 80° C., most preferably from about 100° C. to about 140° C., in an anhydrous reaction media while utilizing a high concentration of a primary amine reagent, leads to the formation of a porous and functionally modified PAEK substrate in a single step. In one such example, a porous PEEK substrate is modified with ≈C=N—CH$_2$CH$_2$OH groups in a single step process from PEEK/PEI blend by reacting the precursor blend article with neat monoethanolamine at about 120° C. The ketimine group can be hydrolytically unstable. To improve hydrolytic stability the ketoimine group can be reduced using a mild reducing agent to form a stable secondary amine linkage.

In some embodiments, it is desirable to form the initial porous PAEK substrate using RPR process without affecting surface modification. The preformed unmodified porous PAEK article formed by the RPR process is then modified in a following step with target functional groups. This enables preparation of PAEK membranes tailored towards the target separation characteristics of the membrane formed by the LbL method. To form an unmodified porous PAEK article by the RPR process, the precursor PAEK/PI blend article is treated with a strong inorganic base or contacted with a primary amine under conditions that suppress ketimine group formation, i.e., at moderate temperatures and in a relatively dilute amine solution that preferably further contains water. It will be recognized by those skilled in the art that, by selecting balanced reaction conditions, the PAEK modification via formation of imine linkages can be largely suppressed while an adequately high rate of polyimide phase decomposition and removal is still maintained. For example, the RPR process can be carried out utilizing monoethanolamine/dimethylformamide/water mixture 20/70/10 by volume at 80° C., which provides for a porous PAEK article formation while suppressing functionalization via the imine group formation. However, if the ketimine groups are still formed during the RPR process they can be removed in a subsequent step via hydrolysis.

PAEK substrates used to form composite membranes of this invention exhibit a nanoporous surface. The PAEK substrates are further characterized by an asymmetric pore structure with smaller size surface pores and larger size interior pores. The composite functionalized separation layer is formed at the surface layer. The surface layer exhibits a narrow pore size distribution with an average pore diameter below 100 nanometers, preferably between 20 and 10 nanometers. The interior membrane pore structure exhibits pore size larger than the surface layer pore size, preferably the interior bulk pore size being is larger than the average surface pore size by a factor of two or more. The PAEK substrates with interior pore structure that combines mesopores and macropores are most suitable for the preparation of high flux composite membranes. The thickness of the surface layer is advantageously below 5 micron, preferably below 1 micron and most preferably below 0.1 micron. The composite separation layer is formed within the surface layer of the substrate or on top of the surface layer. For the asymmetric hollow fiber substrates, the surface layer can be alternatively on the exterior surface or on the interior bore side of the hollow fiber.

In one preferred embodiment of this invention, the composite fluid separation membrane is formed via a sequence of the following steps: (a) forming a blend of the poly (aryl ether ketone) polymer with a polyimide; (b) forming a shaped article from the blend by melt processing, wherein the article is substantially amorphous; (c) subjecting the surface of the article to a solvent treatment step that induces crystallization in the surface of the article to a predetermined depth; (d) subjecting the article to a thermal annealing step to complete crystallization; (e) introducing functional groups on the surface of the article via reaction with benzophenone segments of a polymeric backbone of the polymer; (f) bringing the article into contact with a strong inorganic base, a primary amine or hydrazine to affect the decomposition of the polyimide; (g) removing products of polyimide decomposition to form a porous article; and (h) forming a separation layer on the surface of the porous article, covalently attached to the surface of the porous article, by a layer-by-layer synthesis.

In another preferred embodiment of this invention, the composite fluid separation membrane is formed via a sequence of the following steps: (a) forming a blend of a poly (aryl ether ketone) polymer with a polyimide; (b) forming a shaped article from the blend by melt processing, wherein the article is substantially amorphous; (c) subjecting a surface of the article to a solvent treatment step that induces crystallization in the surface of the article to a predetermined depth; (d) subjecting the article to a thermal annealing step to complete crystallization of the article; (e) introducing functional groups on the surface of the article via reaction with benzophenone segments of a polymeric backbone of the polymer; (f) forming a separation layer on the surface of the article, covalently attached to the surface of the article, by a layer-by-layer synthesis; (g) bringing the article into contact with a strong inorganic base, a primary amine or a hydrazine to affect the decomposition of the polyimide; (h) removing products of polyimide decomposition from the article; and (i) recovering the composite membrane.

The semi-crystalline mesoporous PAEK materials are highly solvent and temperature resistant. This enables modification of pore surfaces without affecting preformed pore structure, morphology, and article's shape. It will be recognized by those skilled in the art that each individual LbL process can be best carried out on PAEK substrate modified with functional groups appropriate to the synthetic scheme that will optimize the desired framework structure. The surface functional groups are selected towards sought structural configuration of the initial LbL layer.

Initial functionalization of PAEK porous substrate by functional groups may include carboxylic groups, hydroxyl groups, primary and secondary amino groups, mercapto-groups, isocyanide groups, or acid chloride groups to name a few. In preferred embodiments, the functional groups on the PAEK substrate's surface are formed by a direct chemical reaction. For example, the porous PAEK substrate prepared as described above is modified by reducing surface ketone groups to form hydroxyl groups or by reacting ketone groups in the benzophenone segments of PAEK polymer with multifunctional primary amine reagents via ketimine group formation to impart the target hydroxyl or amine group functionality.

The functionalization of the PAEK surface with hydroxyl groups and with amino functional groups is particularly preferred. In one example, the PAEK substrate is functionalized with amino functional groups by reacting benzophenone segments in the PAEK polymer backbone with a compound containing multiple primary amino groups via ketimine group formation. This provides for the PAEK substrate functionalized with amino groups. During the reaction, the surface may undergo a partial crosslinking. The ketimine group can undergo reduction in a subsequent step to form hydrolytically more stable secondary amine linkage. In another example, the surface of PAEK media is functionalized by reacting benzophenone segments in in the PAEK polymer backbone with a primary amine compound containing carboxyl groups through ketimine group formation. This provides for the PAEK substrate functionalized with carboxylic groups. The ketimine group can undergo reduction in a subsequent step to form a hydrolytically more stable secondary amine linkage. It is also within the scope of this invention to functionalize the PEAK substrate by reacting benzophenone segments in the PAEK polymer backbone with a primary amine compound containing hydroxyl groups through the keto-imine group formation. This provides a PAEK substrate functionalized with hydroxyl groups. The ketimine group can undergo the reduction in a subsequent step to form a hydrolytically more stable secondary amine linkage. In one preferred method, the surface of the PAEK substrate is functionalized to form ~OH groups via direct reduction of ketone groups in benzophenone segments of the poly (aryl ether) polymer backbone. It is also within the scope of the invention to form PAEK substrate functionalized with primary amino groups via modification of benzophenone segments of the poly (aryl ether) polymer backbone.

Mesoporous PAEK substrate's surface-functionalized with hydroxyl and amino groups are particularly preferred for the composite membrane preparation by the LbL process. The ketone group in the PAEK polymer backbone, in particular, can be used to form functional groups on the PAEK substrate's surface. The high concentration of ketone groups in poly (ether ketone) and poly (ether ketone ketone) polymers provide for a high concentration of functional surface groups upon chemical modification.

The ketone group in the PAEK backbone can be reduced to a hydroxyl group. Thus, functionalized material can be used directly for LbL synthesis, but in some embodiments of this invention it may be desirable to react the hydroxyl groups with an additional brush extender group. The surface hydroxyl groups can be formed by reducing ketone groups on the surface of the PAEK substrate with a reducing reagent, such as sodium borohydride. Direct reduction of ketone groups on the mesoporous surface of PAEK to form diphenylmethanol functional units,

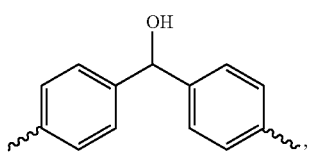

is particularly preferred to form surfaces functionalized with hydroxyl groups. The formation of diphenylmethanol units is further illustrated as follows:

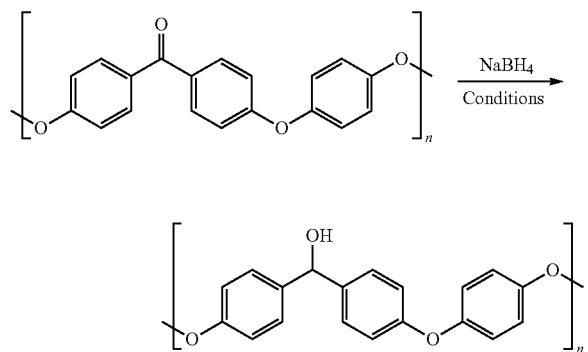

A broad method of PAEK substrate functionalization is via reaction of the ketone group in PAEK backbone with a functional hydrocarbon containing a primary amino group. In this embodiment, the ketone groups in poly (aryl ether ketone) backbone are reacted with a low molecular weight hydrocarbon, oligomer or a polymer containing primary amino-functional groups ~$NH_2$ and additional functional groups that will be used to attach molecules in the first step of LbL synthesis. The attachment of the target molecule to the substrate is thus carried utilizing the primary amino group and is completed via the ketimine group formation. Optionally, in some embodiments, this reaction is followed by ketimine group reduction to form a durable covalent bond of molecules containing functional groups to the PAEK surface.

The functional hydrocarbon molecule is attached to the PAEK substrate's surface via formation of ketimine linkages as further illustrated below:

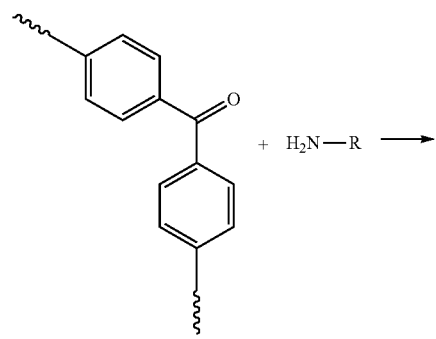

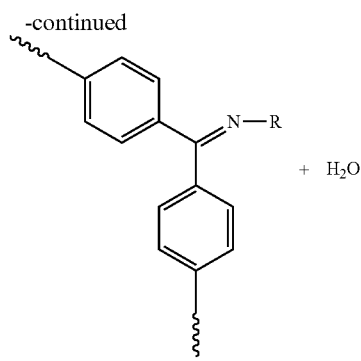

wherein R is a low molecular weight hydrocarbon, oligomer or a polymer containing primary amino-functional groups ~$NH_2$ and at least one additional functional group, such as hydroxyl group, amino group, carboxylic group, or mercapto group, wherein R is an aliphatic or an aromatic radical. Difunctional and multifunctional amines are particularly preferred. Examples of difunctional amines include ethylenediamine, propylenediamine, iso-butylenediamine, 1 diethylenetriamaine, ethylethanolamine, diaminocyclohexane, phenylenediamine, toluenediamine. In one example, R radical contains multiple amino groups to provide PAEK media with a high concentration of functional groups. Molecules containing a high concentration of primary amino groups are particularly preferred. Poly(vinyl amine), polyethylene imine, or poly (ethylene glycol) diamine is utilized to form a gutter intermediate layer on the surface of PAEK substrate. Poly (ethylene glycol) diamine of the general formula

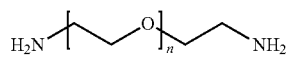

is such defunction R molecule. In preferred embodiments, n can range from 3 to 12. PAEK media with PEG-$NH_2$ functionality is thus utilized for the LbL synthesis.

In some embodiments, the $H_2N$—R molecule contains hydroxyl functional groups rather than an additional amino group. Primary amino hydrocarbons containing hydroxyl groups are utilized to functionalize the PAEK surface. The tertiary or secondary alcohols, ≈C═N—R—OH, or primary alcohols, ≈C═N—R—$CH_2$—OH, are attached to the PAEK porous media via the Schiff base linkage formation (R is an aliphatic, an aromatic or heterocyclic hydrocarbon radical). In some embodiments, it is desirable to reduce the ketimine linkage to form a secondary amine forming ≈C—NH—R—OH or ≈CH—NH—R—$CH_2$—OH groups. The secondary amine group is a more hydrolytically stable bond. In some embodiments, the secondary amine group is further alkylated to form a tertiary amine. The porous PAEK substrate modified with hydroxyl groups can be used directly for the initial step in the LbL synthesis by reacting with multifunctional epoxy or acid chloride molecules.

Examples of aromatic radicals include 4-aminophenol, 6-amino-1-naphthol, 5-amino-1-naphthol, or other aminonaphthols, amino-naphthyl-naphthols, such as 1-(2-aminonaphthalen-1-yl) naphthalen-2-ol, aminoresorcinols, such as 4-aminoresorcinol, 4-hydroxy-2,6-dimethylaniline. One preferred aromatic $H_2N$—R—OH molecule is 4-aminomethyl-benzyl alcohol

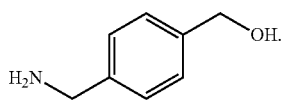

The reaction is carried out by contacting porous PAEK with a solution of 4-aminomethyl-benzyl alcohol in an aprotic solvent at elevated temperature, preferably at 120-140° C. Following the initial attachment, the ketimine group can be reduced to form a more hydrolytically stable linkage by forming a secondary amine.

The functionalization of PAEK media surface with ≈C=N—CH$_2$CH$_2$OH groups can be carried out by reacting ketone groups in the PAEK backbone with monoethanolamine. This can be conveniently carried out during RPR process wherein the porous structure and functionalization take place simultaneously. Alternatively, the pre-formed mesoporous PAEK is reacted with monoethanolamine in a separate step. Other aliphatic amino functional alcohols, such as diethanolamine, propanolamine, dipropanolamine, or 4-amino-1-butanol, can be utilized. One preferred H$_2$N—R—OH linker molecule is amino functionalize poly (ethylene glycol). The H$_2$N—R—OH molecules containing aromatic rings is another class of functional groups. The ketimine group can be reduced in a subsequent step to form a hydrolytically more stable secondary amine linkage.

Figure 2:
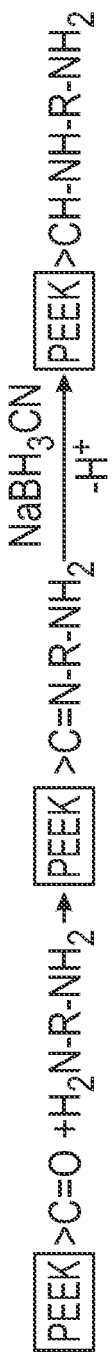
FIG. 2 illustrates preparation of amino functional substrate by attaching functional groups to PEEK surface via Schiff base linkage followed by ketimine group reduction.

Preparation of amino functional media via Schiff base linkage in some embodiments is followed by the ketimine group reduction as shown schematically in FIG. 2 for the PEEK substrate. In the first step, the porous PEEK is reacted with a difunctional hydrocarbon radical, H$_2$N—R—NH$_2$. In the second step, the ketimine group is reduced using NaBH$_3$CN, to form PEEK-NH—R—NH$_2$ functionalized surfaces.

In some embodiment of the invention, the PAEK substrate is modified via modification of ketone groups in the PAEK polymer backbone to form benzhydrylamine functional units on the PAEK surface

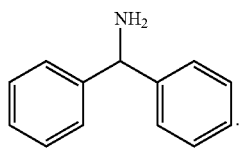 [SMILES: NC(c1ccccc1)c1ccccc1]

A number of methods are known in the art, such as the Leuckart reaction. Amination of aromatic polymer segments of PAEK substrate can be further conveniently achieved by a process of nitration followed by reduction: PAEK-NO$_2$→PAEK-NH$_2$.

Figure 8:
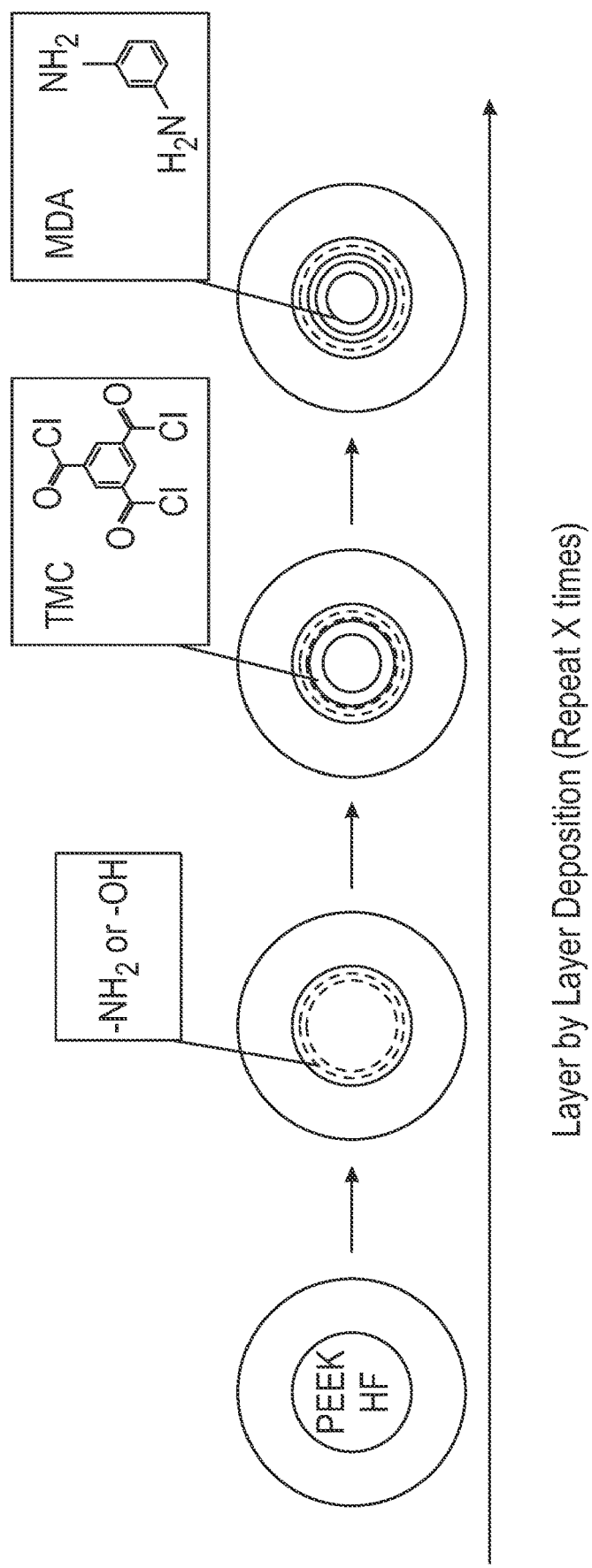
FIG. 8 illustrates a schematic representation of composite organic framework separation layer formation on the lumen side of PEEK hollow fiber. Trimesoyl chloride (TMC) and meta phenylene diamine (MDA) are used in the LbL synthesis. The precursor hollow fiber substrate can be porous or non-porous. The non-porous substrate is converted into a porous material after the LbL process is completed.

The LbL technique builds a polymeric framework via successive exposures to multi-functional monomers, preventing uncontrolled polymerization by limiting reaction sites to the PAEK surface bound moieties. In some preferred embodiments, the network is crosslinked. The separation layer is grown on the PAEK substrate's surface, which presents a high density of chemical groups reactive to the first functional monomer in the LbL process. In one example, the crosslinked polyamide polymeric framework is formed via successive exposures of functionalized PEEK surface to solutions of trimesoyl chloride (TMC) and meta phenylenediamine (MDA). The amine-functionalized PEEK substrate reacts with the carboxylic acid chloride functionality of TMC in the first step in the LbL process. In the following step, the carboxylic acid chloride functionality of the modified substrate is reacted with amine functional groups of MDA. The cycles can be repeated until a desired thickness of the separation layer is reached. The process is shown schematically in FIG. 8. The precursor hollow fiber substrate can be porous or non-porous. The non-porous substrate is converted into a porous material after the LbL process is completed.

In another example, the crosslinked polyester polymeric framework is formed via successive exposures of functionalized PAEK surface to solutions of trimesoyl chloride (TMC) and resorcinol, 1,3-benzene diol. The hydroxyl group functionalized PAEK substrate reacts with the carboxylic acid chloride functionality of TMC in the first step of the LbL process via ester group formation. In the following step, the carboxylic acid chloride functionality of the modified substrate is reacted with hydroxyl functional groups of resorcinol. The cycles can be repeated until the desired separation efficiency is reached.

In some embodiments, the first layer deposited and covalently attached to the PAEK substrate via surface functional groups is not crosslinked and acts as an intermediate gutter layer to direct the flow of fluid into the surface pores of the substrate. Multi-functional polyethylene glycol or polyethylene amine can be used advantageously to form the intermediate gutter layer. Multi-functional polyethylene glycol can be also utilized as an exterior layer in the LbL process to form a fouling-resistant surface. A sufficient number of reticulate layers are formed by the LbL process on top of the gutter layer to form a defect-free separation layer of the desired separation efficiency, i.e., molecular weight cut off. The multi-functional monomers used in the construction of successive layers can be identical or different. In some embodiments, it is desirable to construct the composite separation layer with an asymmetric structure, wherein the exterior layer in contact with the feed fluid solution contains smaller size pores as compared to the interior layer. The construction of an asymmetric structure is accomplished by judicious selection of functional monomers, with a larger size spatially rigid monomers used in the construction of the initial layer. This hierarchical LbL process, wherein the first and subsequent layers attached to the poly (aryl ether ketone) substrate are formed with different functional monomers, generates a sequential decrease in the pore size. Larger size pores can be further formed by the incorporation of non-functional organic molecules in the desired layer, such as surfactants or salts. The non-functional molecules serve as an additional template to control pore size.

In one preferred embodiment, the PAEK substrate is functionalized with hydroxyl groups, and the first LbL layer is formed by reacting hydroxyl groups with monofunctional or multifunctional epoxide group containing molecules. The epoxide containing molecules include aromatic, aliphatic, or cycloaliphatic molecules. Examples of epoxy-functional molecules include aromatic diglycidyl molecules, such as bisphenol A diglycidyl ether, diglycidyl ethers of bisphenol F, Bis[4-(glycidyloxy)phenyl]methane, resorcinol diglycidyl ether, diglycidyl terephthalate, or aromatic tri and tetra glycidyl molecules, such as triglycidyl-p-aminophenol (TGAP, Araldite MY0510), tetraglycidyl diaminodiphenylmethane (TGDDM, Araldite MY721), 4,4'-Methylenebis(N, N-diglycidylaniline), N,N,o-Triglycidyl-p-aminophenol, triphenylomethane triglycidyl ether, or aliphatic multifunctional glycidyl ethers, such as trimethylolpropane triglycidyl ether, 1,4-Bis(2,3-epoxypropyloxy)butane, 1,4-butanediol diglycidyl ether, polyoxyethylene bis(glycidyl ether)s of different molecular weights, 1,3-bis(2,3-epoxypropoxy)-2,2-dimethylpropane, pentaerythritol polyglycidyl ether, 3,4-epoxycyclohexylmethyl-3',4'-epoxycyclohexane carboxylate, sorbitol polyglycidyl ether, glycerol polyglycidyl ether, trimethylolpropane polyglycidyl ether, or heterocyclic glycidyl ethers, such as triglycidyl isocyanurate, or a novolac epoxy, such as phenol novolac epoxy or cresol novolac epoxy of different molecular weights.

Figure 3:
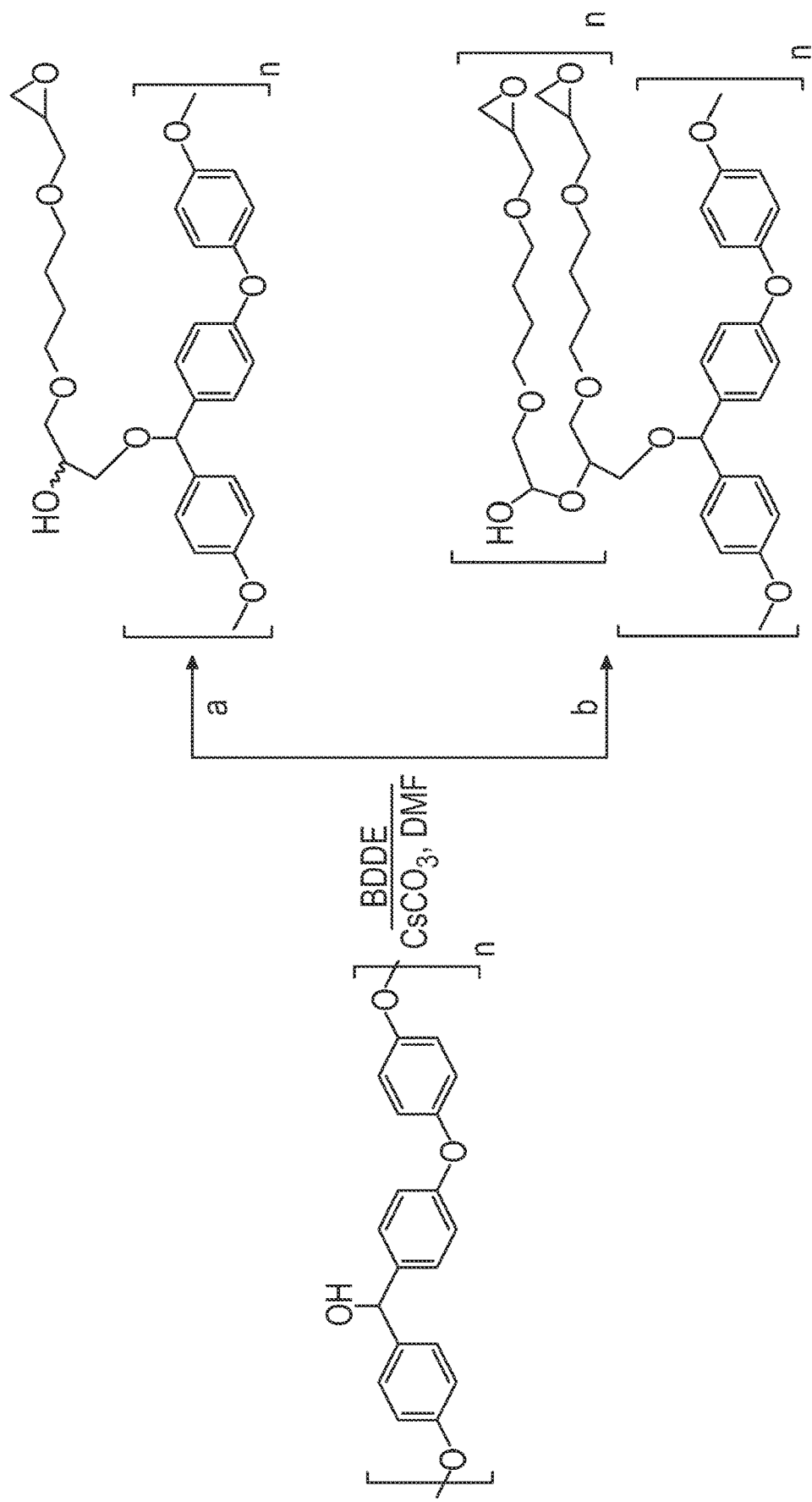
FIG. 3 illustrates schematics of hydroxyl group surface-functionalized poly(ether ether ketone) reaction with 1,4-Butanediol diglycidyl ether in step 1 of LbL synthetic process. Initial adduct formed in step (a) generates a new hydroxyl group, the new hydroxyl group can react with an additional BDDE molecule to form a branched adduct (b).
Figure 4:
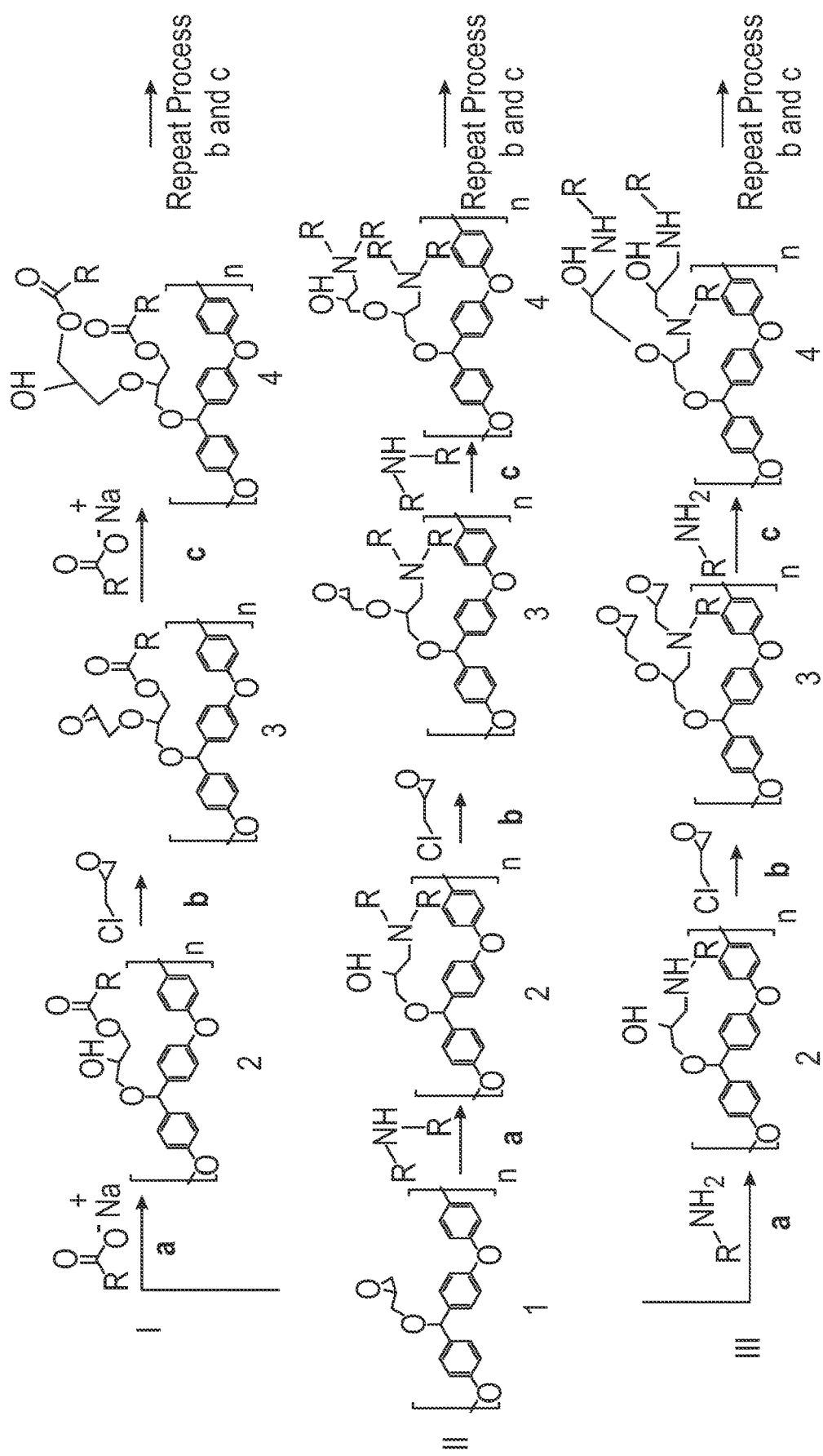
FIG. 4 illustrates alternative synthetic routes to forming composite surface layers by LbL processes on the surfaces of poly(ether ether ketone) substrate functionalized with epoxy functional groups, as follows: (I) LbL layer constructed using the combination of carboxyl functionalized molecule and epichlorohydrin (monofunctional and multifunctional reagents can be utilized, monofunctional reagents shown), (II) LbL layer constructed using the combination of secondary amine functionalized molecule and epichlorohydrin (monofunctional and multifunctional reagents can be utilized, monofunctional reagents shown), and (III) LbL layer constructed using the combination of primary amine functionalized molecule and epichlorohydrin (monofunctional and multifunctional reagents can be utilized, monofunctional reagents shown).

In one preferred example, the poly(ether ether ketone) functionalized with —OH groups is reacted with 1,4-Butanediol diglycidyl ether (BDDE) in step 1 of the LbL synthetic process. The reaction of poly(ether ether ketone) surface-functionalized with hydroxyl groups with the 1,4-Butanediol diglycidyl ether in step 1 of the LbL synthetic process is shown schematically in FIG. 3. The reaction provides for the formation of new hydroxyl groups that can in turn react with additional BDDE molecules leading to branching. The epoxy groups on the surface of the initial layer can be utilized to form additional layers via reticular LbL synthetic steps. An example of a composite layer built via several optional synthetic routes utilizing epoxy-functional molecules is shown in FIG. 4.

Figure 5:
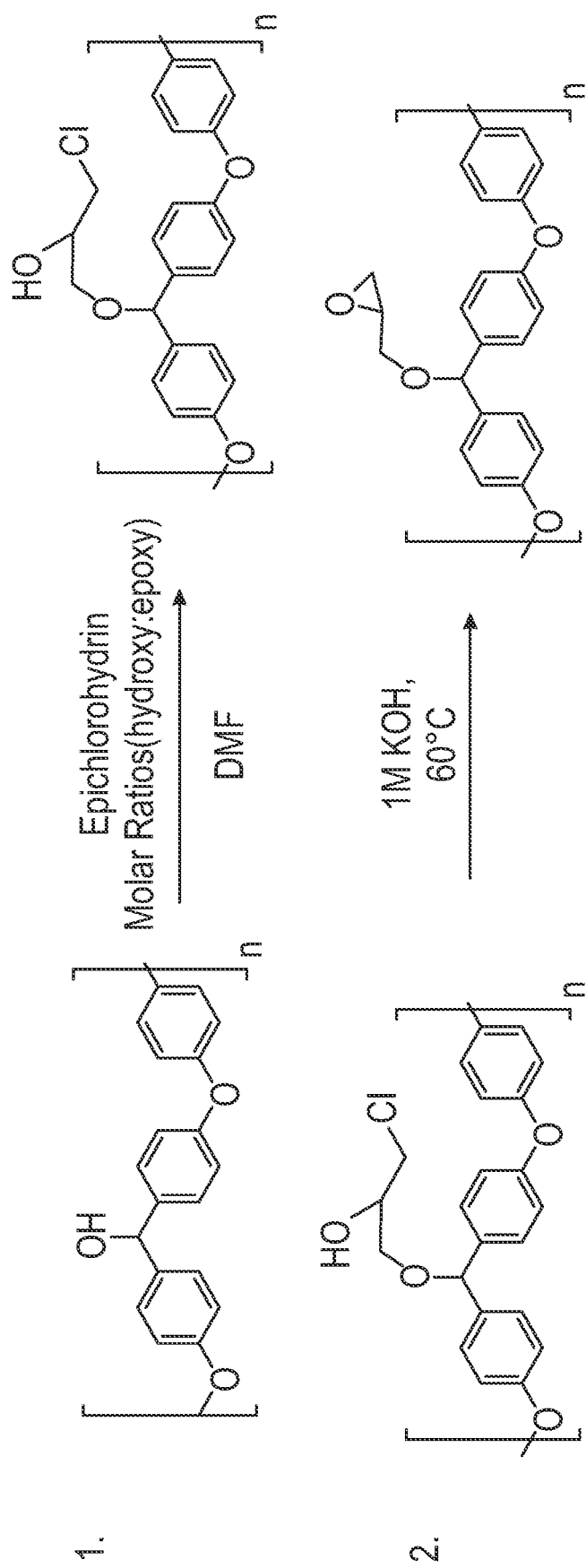
FIG. 5 illustrates reaction schematics of poly(ether ether ketone) surface epoxidation via reaction of poly(ether ether ketone) intermediate surface-functionalized with hydroxyl groups with epichlorohydrin.

In one preferred example, the poly(ether ether ketone) functionalized with —OH groups is reacted with epichlorohydrin in step 1 of the LbL synthetic process. The epoxidation of poly(ether ether ketone) surface via reaction of poly(ether ether ketone) intermediate surface-functionalized with hydroxyl groups with epichlorohydrin is shown schematically in FIG. 5. The thus formed surface layer functionalized with epoxy groups can be used for the reticulate LbL process to form a composite separation layer of a desired thickness and separation characteristics. Alternative synthetic routes of forming composite surface layers by LbL processes on the surfaces of poly(ether ether ketone) substrate functionalized with epoxy functional groups are shown in FIG. 4: (I) LbL layer is constructed using the combination of carboxyl functionalized molecule and epichlorohydrin (monofunctional and multifunctional reagents can be utilized, monofunctional reagents are shown), (II) LbL layer is constructed using the combination of secondary amine-functionalized molecule and epichlorohydrin (monofunctional and multifunctional reagents can be utilized, monofunctional reagents are shown), and (III) LbL layer is constructed using the combination of primary amine-functionalized molecule and epichlorohydrin (monofunctional and multifunctional reagents can be utilized, monofunctional reagents are shown).

In another preferred embodiment, the PAEK substrate is functionalized with hydroxyl groups, and the first LbL layer is formed by reacting hydroxyl groups with a monofunctional or multifunctional acid chloride or a carboxylic acid group containing molecules. The acid chloride or carboxylic acid groups containing molecules include aromatic, aliphatic, or cycloaliphatic molecules. Examples of acyl chloride functional molecules include multi-functional acyl chloride aromatic molecules, such as tere or iso benzenedicarbonyl chloride, 1,3,5-Benzenetricarbonyl trichloride, biphenyl-4,4'-dicarbonyl dichloride, naphthalenedicarbonyl chlorides, 1,1'-biphenyl]-2,2'-dicarbonyl dichloride, or multi-functional acyl chloride aliphatic molecules, such as 1,2-cyclohexanedicarbonyl dichloride, 1,3-cyclohexanedicarbonyl dichloride, 1,4-cyclohexanedicarbonyl dichloride, cyclohexane-1,2,4-ticarbonyl chloride, butane-1,4-dicarbonyl chloride.

It is also within the scope of the invention to functionalize the PAEK substrate with hydroxyl groups and to form the first LbL layer by reacting hydroxyl groups with amino acid molecules. It is further within the scope of the invention to react hydroxyl groups with isocyanate group containing molecules, aldehyde group containing molecules, and other functional molecules capable of a covalent bond with aromatic alcohols.

Figure 6:
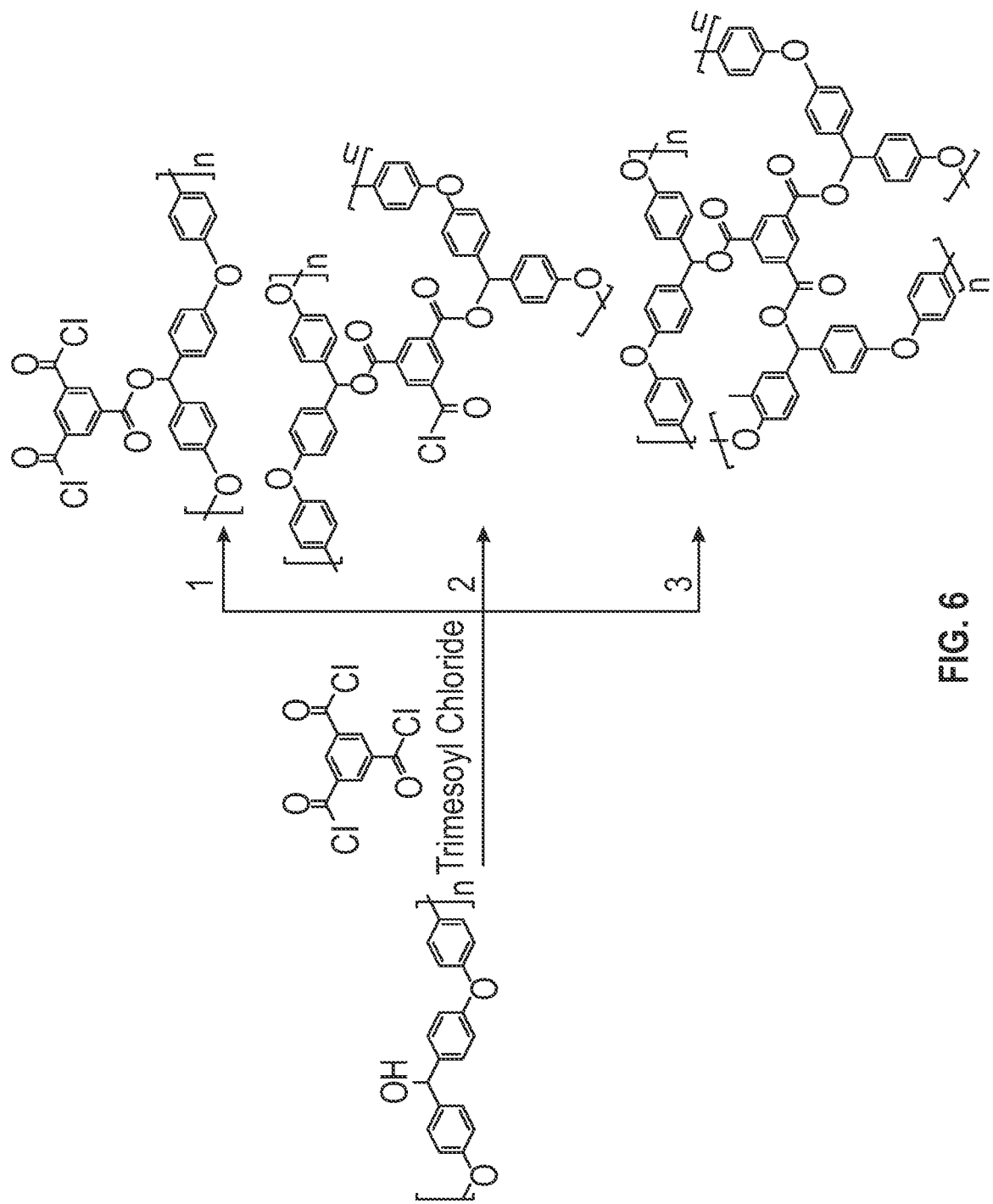
FIG. 6 illustrates a synthetic route to forming initial composite surface layers by LbL processes on the surfaces of poly(ether ether ketone) substrate functionalized with hydroxyl functional groups via reaction with trimesoyl chloride. The stoichiometric ratio of reactive functional groups and reaction conditions affect the degree of crosslinking; the degree of crosslinking increases from the initial attachment stage (a) through stages (b) to (c).

In one example, the semicrystalline porous PAEK support surface-functionalized with hydroxyl —OH, or alternatively with primary amino —NH$_2$, or secondary amino ≈NH groups is exposed to the solution of multifactional carboxyl acid chloride organic molecule for a time sufficient to complete covalent attachment of the first layer in the reticulate LbL cycle. The synthetic route to forming initial composite surface layers by LbL processes on the surfaces of poly(ether ether ketone) substrate functionalized with hydroxyl functional groups via reaction with trimesoyl chloride is shown in FIG. 6. The stoichiometric ratio of reactive functional groups and reaction conditions affect the degree of crosslinking; the degree of crosslinking increases from the initial attachment stage (a) through stages (b) to (c). The thus formed layer is washed to remove any excess of the acid chloride organic molecule and the residual active carboxylic acid chloride groups of the initial layer are exposed to a solution of a multi-functional amine organic molecule for a time sufficient to complete the covalent attachment of the second layer. The thus formed layer is washed to remove any excess of the multifunctional amine. The reticulate LbL process can be optionally repeated for a number of additional cycles to form the separation layer with desired separation characteristics.

Figure 7:
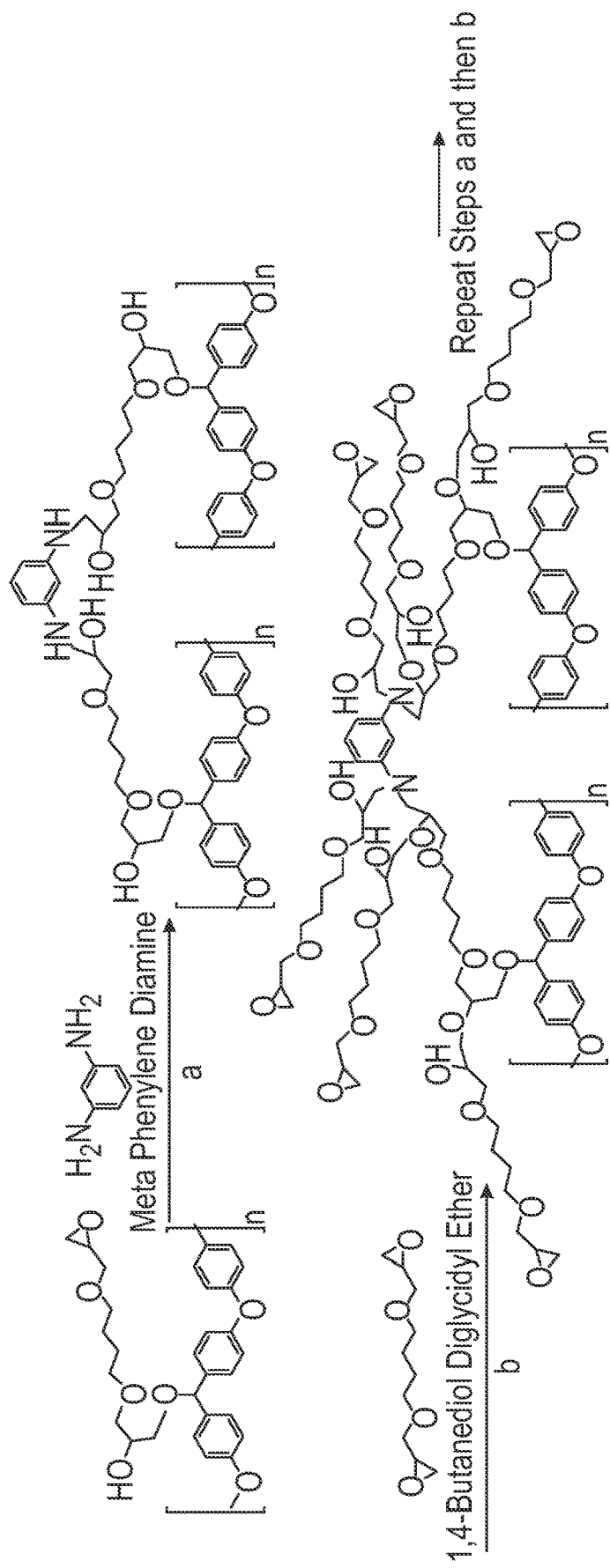
FIG. 7 illustrates a synthetic route of forming composite separation layers on the surfaces of poly(ether ether ketone) substrate functionalized with hydroxyl functional groups by the reticulate LbL process via sequential reactions with multifunctional epoxy molecule 1,4-Butanediol diglycidyl (BDDE) (step a) followed by the reaction with multifunctional amine molecule meta phenylene diamine (MPD) (step b). The initial cycle can be repeated N times.

In another example, the composite separation layer on the surfaces of the poly(ether ether ketone) substrate functionalized with hydroxyl functional groups is formed via sequential reactions with multifunctional epoxy molecule 1,4-Butanediol diglycidyl (BDDE) (step a) followed by the reaction with multifunctional amine molecule meta phenylene diamine (MPD) (step b). One possible synthetic route is shown schematically in FIG. 7. A number of different crosslinked structures can be formed based on the stochiometry of reagents; excess of meta phenylene diamine provides for the availability of primary functional groups for the subsequent reaction with BDDE. The initial cycle can be repeated N times to form the separation layer with desired separation characteristics.

Functionalized mesoporous PAEK substrate is used to prepare composite membranes by the wet chemistry LbL process. A broad range of solvents can be utilized in the LbL process. The semi-crystalline structure of the PAEK substrates makes them highly solvent resistant. Mild swelling may take place in contact with certain aggressive solvents. Aromatic, aliphatic and chlorinated hydrocarbons, aprotic solvents, alcohols, and ketones can be used in the LbL synthesis as long as the solvent media is not reactive toward monomers. Extensive washing is required after each reticulate synthetic step to remove unreacted monomers. In some embodiments, the concentration of the functional monomer in the applied solution can range from 0.01 weight % to about 20 weight %, preferably about 0.1 weight % to about 5 weight %. To affect the formation of chemical bonds the substrate is exposed to the monomer solution from several seconds to an hour; the reaction is followed by washing to remove the unreacted monomer. The reaction can be accelerated by heating.

The composite membrane formed according to the methods of this invention is incorporated into a separation device and is used to separate components of fluid mixtures. Thus, it is within the scope of the invention to form the composite membrane by the LbL process on the PEAK precursor substrate first and to package the thus formed membrane into a device. It is also within the scope of the instant invention to construct a separation device utilizing shaped PAEK substrate first and carry out substrate functionalization steps and the formation of the covalent organic framework separation layer in situ in the preformed membrane device. Thus, the reaction schemes summarized in FIGS. 1A-1E can be carried out in the preformed separation device constructed utilizing the shaped PAEK substrate. The shape of the PAEK substrate will determine the configuration of the device, which can be in the form of a flat sheet device, such as a spiral wound cartridge, in the form of a hollow fiber cartridge, or in the form of a monolith. The device can be constructed from a porous or a non-porous PAEK precursor substrate. In the latter case, the non-porous precursor is converted into a porous membrane after the surface functionalization stage or following the formation of the composite layer.

Figure 9A:
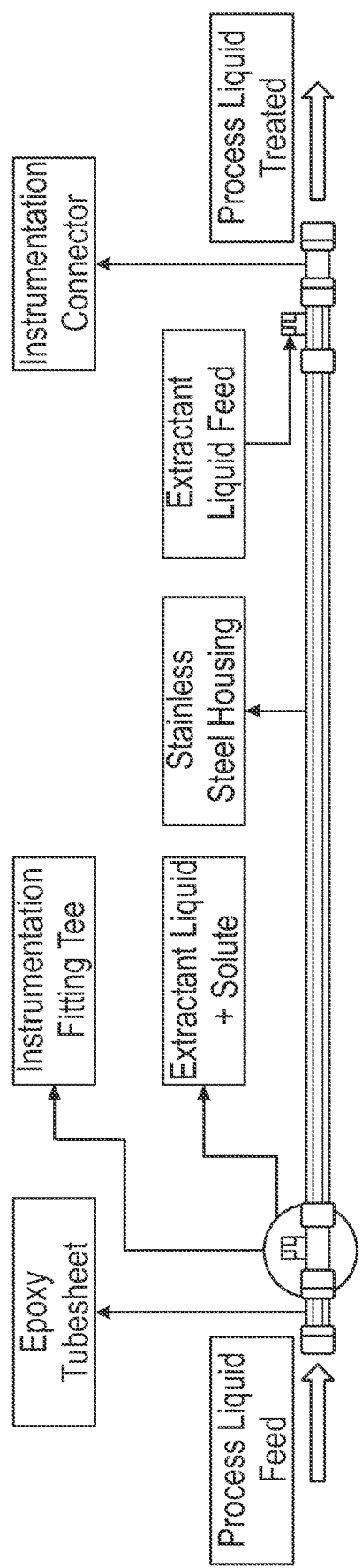
FIG. 9A illustrates hollow fiber assembly used to form the composite organic framework separation layer on the lumen side of PEEK hollow fibers.
Figure 9B:
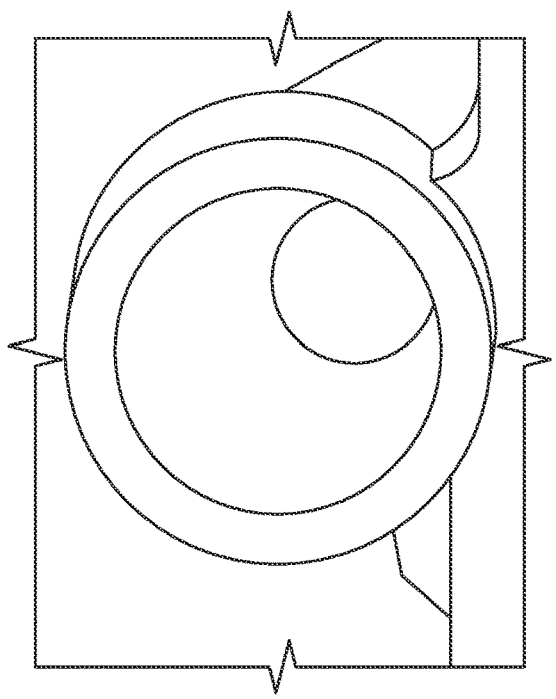
FIG. 9B illustrates a scanning electron microscope microphotograph of porous PEEK hollow fiber cross-section.

The PAEK substrate configurations are highly flexible and can be packaged into membrane filter reaction vessels. In these vessels, the substrate is easily accessible to reactants. The PAEK substrate is packaged into a permanent or temporary housing to carry out the stepwise LbL syntheses. The housing can be jacketed to carry out reactions at a controlled temperature. The experimental hollow fiber assembly used to carry out LbL synthesis is shown schematically in FIG. 7. PEEK hollow fibers are formed into a cartridge by forming fluid-tight tubesheets and the cartridge is s sealed within the housing. The tubesheets are formed by utilizing epoxy resins or other appropriate sealing materials. A small hollow fiber permeator is shown in FIGS. 9A and 9B. The permeator contains 10 to 100 hollow fibers. Commercial hollow fiber devices contain thousands of fibers in a single cartridge. In the arrangement shown, the PAEK surface functionalization and the subsequent LbL synthesis are carried out on the lumen side of the hollow fiber. The preformed porous hollow fiber can be utilized. Alternatively, a dense non-porous PAEK precursor is used as the initial substrate and converted into the porous configuration following modification. The reactants and wash solutions are introduced via the feed port of the housing. The port is connected to a pump or another delivery system to introduce and transport reactants through hollow fibers. The liquid flow rate is controlled to allow for acceptable yield during each reaction step and to reduce reactant wastage. Optionally, the progress of the reaction is monitored continuously by measuring reactant concentration in the exit waste line. The reactant delivery rate can be adjusted to reduce bypass and underutilization of reactants. Upon the completion of a step the process is switched to the next step.

The washing steps can be monitored and the process transitioned to the next step implemented once the target eluent purity is reached. The monitoring lowers the consumption of reagents and shortens the LbL process duration. The assembly can be thermostated to control reaction rates. The flow through methodology ensures efficient contact between reactants and the substrate.

To attain optimal PAEK material surface modification or to improve the efficiency of the LbL process, in some embodiments, the reaction advantageously is carried out in anhydrous conditions and/or at an elevated temperature. The PEAK substrates are highly temperature and solvent-resistant. The reaction temperature during LbL synthesis can be between 20° C. to 180° C., or preferably between 25° C. to 70° C.

The mesoporous poly (aryl ether ketone) substrates of this invention can be utilized to form composite PAEK membranes with a broad range of separation layer structures that, in turn, address a broad range of fluid separation applications. The applications may include ultrafiltration (UF), nanofiltration (NF), and reverse osmosis (RO) processes, well-established applications. Emerging applications, such as organic solvent nanofiltration and the separation and recovery of active pharmaceutical ingredients (APIs), can be further efficiently addressed by the membranes of this invention.

The present invention is described below by examples, which should not be construed as limiting the present invention.

EXAMPLES

Preparatory Example 1

This example describes the preparation of a porous PEEK hollow fiber surface-functionalized with hydroxyl groups. Poly (ether ether ketone) and polyetherimide (PEEK/PEI) blend (PEEK, Victrex 381G and PEI Ultem 1000; 50:50 by weight) was compounded in a twin extruder. A precursor hollow fiber with 500 micron outside diameter and 300 micron inside diameter was prepared by melt extrusion at circa 380° C. and quenched in water. The hollow fiber was substantially amorphous. The exterior surface of the hollow fiber was washed with hexane, followed by acetone solvent treatment at 50° C. for 20 min. The solvent treatment is directed to affect surface crystallization. The hollow fiber was further treated at 310° C. for 0.5 hours to affect the crystallization of the PEEK polymer in the bulk of the wall. The hollow fiber was treated with 1.0% w/v sodium borohydride solution in THF/PEG (1:1 ratio) for 30 min while maintaining the solution at reflux. The hollow fiber was then washed sequentially with dilute HCl solution (0.1 N) and distilled water and then dried under nitrogen at 80° C. to a constant weight. The surface-functionalized hollow fibers were immersed into NMP/monoethanolamine/water solution 80/10/10 by volume at 80° C. for 24 hours. The reservoir containing the solution was blanketed with nitrogen. Hollow fibers were removed from the solution and washed extensively with water followed by isopropanol and acetone. Hollow fibers were then dried at 80° C. overnight. The thus prepared surface-functionalized hollow fiber membrane consisted of an ultra-thin surface layer functionalized with hydroxyl groups with the interior bulk wall porosity unaffected by the functionalization. The surface of the modified hollow fiber was found to be highly hydrophilic and easily wetted with water. The surface characteristics of thus formed hollow fiber were evaluated using ATR-FTIR. ATR-FTIR spectra showed a significant reduction of >C=O group concentration (based on a decrease in absorption of γ C=O at 1640 $cm^{-1}$ and 1597 $cm^{-1}$) and a high concentration of —OH groups attributed to the formation of benzhydrol moiety of thus functionalized PEEK was detected (γ O—H peak at 3400 $cm^{-1}$). The concentration of hydroxyl groups was measured by dissolving functionalized hollow fibers in concentrated sulfuric acid. The PEEK-OH forms a carbo-cation upon dissolution is sulfuric acid that displays a distinct red color. Absorption peak intensity at 508 nm was measured in UV-VIS spectra to determine —OH group concentration. The calibration curve was constructed using model compound bis(4-(4-methoxyphenoxy) phenyl) methanol (BMPPM). The concentration of surface hydroxyl groups was 1.68E-03 mmol/g.

Preparative Example 2

This example describes the preparation of porous PEEK substrate modified with hydroxyl groups in a single-step pore formation surface modification process. Poly (ether ether ketone) and polyetherimide (PEEK/PEI) blend (PEEK, Victrex 381 G and PEI Ultem 1000; 50:50 by weight) was compounded in a twin extruder. A precursor hollow fiber 500 micron outside diameter and 300 micron inside diameter was prepared by melt extrusion at circa 380° C. and quenched in water. Hollow fibers were washed first with hexane, followed by acetone wash at 50° C. for 20 min. The hollow fibers were then treated at 300° C. for 0.5 hours to affect the crystallization of the PEEK polymer phase. The hollow fibers were brought into contact with a neat monoethanolamine and maintained at 120° C. for 8 hours The reservoir containing the solution was blanketed with nitrogen. The thus formed porous PEEK hollow fibers were washed with fresh IPA. The hollow fibers were further washed with water in a flow-through method. The hollow fibers were then dried by circulating nitrogen through the module at 80° C. overnight. The XPS analyses indicated that the hollow fiber contained 1.5% of nitrogen on the bore surface side. No residual polyetherimide was detected by ATR-FTIR analyses. Gravimetric analysis indicated complete removal of the polyetherimide. The presence of nitrogen was attributed to the formation of $\approx C=N-R-CH_2OH$ groups on porous PEEK hollow fiber surfaces.

Preparative Example 3

This preparative example describes the preparation of porous PEEK hollow fiber substrate without initial surface modification. Poly (ether ether ketone) and polyetherimide (PEEK/PEI) blend (PEEK, Victrex 381G and PEI Ultem 1000; 50:50 by weight) was compounded in a twin extruder. A precursor hollow fiber 500 micron outside diameter and 300 micron inside diameter was prepared by melt extrusion at circa 380° C. and quenched in water. Hollow fibers were washed first with hexane, followed by acetone wash at 50° C. for 10 min. The hollow fibers were then treated at 300° C. for 0.5 hours to affect the crystallization of the PEEK polymer phase. Hollow fibers were placed into a solution comprised of DMF, monoethanolamine, and water 80/10/10 by volume, and the solution was maintained at 90° C. for 12 hours. The reservoir containing the solution was blanketed with nitrogen. The thus formed porous PEEK hollow fibers were washed sequentially with 1 N NaOH, water and IPA. Hollow fibers were then dried at 80° C. overnight. The XPS analyses indicated that the hollow fiber surface contained 0.03% of nitrogen. The elemental analyses indicated that the hollow fiber contained 0.02% of nitrogen. No residual polyimide was detected by FTIR analyses. Gravimetric analysis indicated substantially complete removal of the polyetherimide. The results indicate that a porous PEEK hollow fiber substrate was obtained and that the material is essentially free of surface modification by monoethanolamine via ketimine group formation. The surface average pore size as measured by atomic force microscopy was 12 nm.

Preparatory Example 4

This example describes the preparation of porous PEEK substrate modified with amino functional groups. The hollow fibers prepared as described in the Preparatory Example 3 were treated with a neat diethylenetriamine solution for 12 hours while the solution was maintained at 119° C. The reservoir containing the solution was blanketed with nitrogen. The thus formed porous PEEK hollow fibers were washed extensively with fresh IPA. The hollow fibers were further washed with water. The hollow fibers were then dried at 80° C. overnight. The XPS analyses indicated that the material contained 3.8% atomic concentration of nitrogen (about 4.0% mass). The N 1s peak deconvolution provided C—N bond concentration of 65%, C=N bond concentration of 33% and N—O bond concentration of 2%. No residual polyetherimide was detected by ATR-FTIR analyses. Gravimetrical analysis indicated quantitative removal of polyetherimide. The nitrogen was attributed to the presence of $\approx C=N-CH_2CH_2-NH-CH_2CH_2-NH_2$ groups attached to the PEEK surface via the ketoimine linkage. The —NH$_2$ group concentration was 0.8 meq/g. When subjected to the Kaiser ninhydrin test, the amine-functionalized PEEK gave a dark blue color after 25 sec at 25° C.

Example 5

This example describes the preparation of a composite PEEK membrane by the LbL process. The functionalized PEEK hollow fibers prepared as described in Preparatory Example 4 were used to construct a hollow fiber permeator assembly shown in FIGS. 9A and 9B. The hollow fibers in the assembly were treated via successive exposures to trimesoyl chloride (TMC) and meta phenylenediamine (MPD). The amine-functionalized PEEK substrate was reacted first with the carboxylic acid chloride functionality of TMC in the reticulate LbL synthesis. In the following step, the carboxylic acid chloride functionality of the modified hollow fiber was reacted with amine functional groups of MPD. The solution of reactants and washing fluids was introduced into the shell side of the hollow fiber assembly through the side port of the module. The reservoir containing solutions of reactants and washing fluids was maintained under nitrogen. Dilute solutions of TMC in toluene and MPD in toluene (0.05M) were prepared for the two reaction steps in the deposition cycle. Dry toluene and acetone solutions were prepared for rinse steps in the deposition cycle. In the first step, the PEEK substrate surface was contacted with the dilute TMC solution in toluene which reacts with pendant amino groups. The solution was introduced on the shell side and after 30 s of exposure time, the solution was removed, replaced by toluene, and the hollow fibers were rinsed with the toluene and the excess of the toluene was removed under the flow of nitrogen. At this stage of the cycle, the surface contained an excess of unreacted carboxylic acid chloride groups. In the following half-cycle, the PEEK hollow fiber surface was further reacted with the dilute MPD solution in toluene for 30 s. The solution was removed, and replaced by acetone, and the hollow fiber was washed extensively with acetone to remove any unreacted MPD. At the end of the first complete cycle, the hollow fiber surface contained an excess of amine groups that are reactive to TMC. The reticulate synthesis and the deposition cycles were continued. The number of reticulate cycles affects membrane properties. The process was stopped after three cycles. Depending on the monomer composition of the last solution used in the cycle (TMS or MDA) the surface of the composite layer may have an excess of amino or carboxylic acid groups. Carboxylic acid groups are formed upon hydrolysis of acid chloride groups. The presence of these functional groups can contribute to the tailored separation properties of the membrane. The separation characteristic of the composite hollow fiber membrane assembly was evaluated utilizing 10,000 Mw polystyrene dissolved in toluene. The measure rejection of the polystyrene was 98%.

Example 6

This example demonstrates the formation of PEEK hollow fiber surface-functionalized with epoxy groups. Hollow fibers surface-functionalized with hydroxyl groups as described in Preparatory Example 1 were treated with 1,4-Butanediol diglycidyl ether (BDDE) as shown schematically in FIG. 3. Hollow fibers were placed in the solution of BDDE/CsCO3 solution in DMF and maintained at 60° C. for 4 hours (reagent concentration 0.2%, BDDE/CsCO3 ratio 1:1). The hollow fibers were washed with water extensively, followed by extensive washing with ethyl ether, and dried. The epoxy group concentration was determined by titration with a standard 0.1M NaOH solution. The indicator solution was prepared by mixing 0.1% cresol red and 0.1% thymol solution at a volume ratio of 1:3 and then adjusting to a neutral pH with 0.01 M sodium hydroxide aqueous solution. The epoxy group concentration of the surface-functionalized hollow fiber was 1.88E-03 mmol/g.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A method of separating a fluid mixture into a fraction enriched in a first component and a fraction depleted in the first component, said method comprising the step of contacting said fluid mixture with a fluid separation membrane while maintaining a pressure difference, or in case of a vapor component a partial pressure difference, across the fluid separation membrane, the fluid separation membrane having a separation layer formed on a surface of a porous poly (aryl ether ketone) substrate that has an exterior surface functionalized with reactive functional groups, wherein the separation layer is formed by a layer-by-layer deposition of a polymeric network covalently attached to the poly (aryl ether ketone) substrate via said functional groups, whereby the fraction enriched in the first component and the fraction depleted in the first component are generated by preferentially permeating a portion of the fluid mixture through the fluid separation membrane.

2. The method of claim 1 wherein the fluid separation membrane is formed by a multi-step process comprising the steps of: (a) forming a solid (non-porous) precursor article of a desired shape from a poly (aryl ether ketone) polymer blended with a pore forming material, (b) modifying a surface of the precursor article with functional groups, (c) forming a separation layer on top of the surface of the modified precursor article by a layer-by-layer deposition of a polymeric network covalently attached to the surface of the modified precursor article via the functional groups, and (d) converting the solid precursor article into a porous membrane by removing the pore forming material.

3. The method of claim 1 wherein the fluid separation membrane is formed by a multi-step process comprising the steps of: (a) forming a solid (non-porous) precursor article of a desired shape from a poly (aryl ether ketone) polymer blended with a pore forming material, (b) converting the solid precursor article into a mesoporous substrate by removing the pore forming material, (c) modifying a surface of the mesoporous substrate with functional groups, and (d) forming a separation layer on top of the surface of the modified mesoporous substrate by a layer-by-layer deposition of a polymeric network covalently attached to the surface of the modified mesoporous substrate via the functional groups.

4. The method of claim 2 wherein the solid precursor article formed in step (a) is substantially amorphous and undergoes crystallization prior to step (b) via a sequence of a solvent induced crystallization followed by a thermal annealing.

5. The method of claim 3 wherein the precursor article formed in step (a) is substantially amorphous and undergoes crystallization via a sequence of a solvent induced crystallization followed by a thermal annealing prior to step (b).

6. The method of claim 1 wherein the poly (aryl ether ketone) substrate is functionalized with reactive groups selected from amino, epoxy, carbonyl chloride, hydroxyl and/or mercapto groups and the separation layer is formed by a layer-by-layer deposition of a polymeric network covalently attached to the poly (aryl ether ketone) substrate via the functional groups.

7. The method of claim 1 wherein at least one layer within the separation layer is formed by a layer-by-layer deposition of reactive molecules selected from functional acid chloride molecules, functional epoxy molecules or functional primary or secondary amine molecules.

8. The method of claim 2 wherein the functional groups comprise hydroxyl groups and a first layer is formed by reacting the hydroxyl groups with an epoxy functional molecule or an acyl chloride functional molecule.

9. The method of claim 8 wherein the epoxy functional molecule is epichlorohydrin.

10. The method of claim 9 wherein the first layer is reacted with a functional amine molecule.

11. The method of claim 8 wherein the epoxy functional molecule is selected from an aromatic diglycidyl molecules, or aromatic tri and tetra glycidyl molecules, aliphatic multifunctional glycidyl ethers, heterocyclic glycidyl ethers, or novolac epoxies.

12. The method of claim 8 wherein the acyl chloride functional molecule is selected from multi-functional acyl chloride aromatic molecules, or multi-functional acyl chloride aliphatic molecules.

13. The method of claim 1 wherein the separation layer is comprised of multiple layers formed by a sequence of reticulate synthetic steps with multifunctional reactive monomers, wherein the surface of the substrate is washed after each reactive step to remove an unreacted monomer.

14. The method of claim 13 wherein the multiple layers comprise between 2 and 10 layers.

15. The method of claim 13 wherein a first reactive monomer is a multifunctional poly (ethylene glycol).

16. The method of claim 14 wherein the monomer in at least one layer comprises a mixture of monomers.

17. The method of claim 1 wherein the poly (aryl ether ketone) substrate is formed by melt processing.

18. The method of claim 2 wherein the separation layer is comprised of multiple layers, wherein at least one layer is formed by reacting multifunctional acid chloride molecules with multifunctional amine group containing molecules, multifunctional acid chloride molecules with multifunctional hydroxyl group containing molecules, multifunctional epoxy molecules with multifunctional amine group containing molecules, or multifunctional epoxy molecules with multifunctional hydroxyl group containing molecules.

19. The method of claim 1 wherein the poly (aryl ether ketone) substrate is shaped as a film, a frit, a hollow fiber or a monolith.

20. The method of claim 1 wherein feed and the permeate sides of the fluid separation membrane are sealed in a fluid tight arrangement in a housing.

21. The method of claim 20 wherein the housing has a feed entrance port, a non-permeate exit port and a permeate exit port and the fraction enriched in the first component is removed through the non-permeate exit port and the fraction depleted in the first component is removed through the permeate exit port.

22. The method of claim 1 wherein the poly (aryl ether ketone) is a poly (ether ether ketone), a poly (ether ketone ketone), a poly (ether ketone ether ketone ketone) or a poly (ether ketone).

23. The method of claim 2 wherein the pore forming material is a polyimide or a mixture of a polyimide with at least one additional pore forming material.

24. The method of claim 23 wherein the polyimide is a poly (ether imide).

25. The method of claim 23 wherein the at least one additional pore forming material is a poly (ether sulfone), a poly (ether ether sulfone) or a polycaprolactone.

26. The method of claim 23 wherein the poly (ether ketone) substrate is converted into a mesoporous material by treating with a solution containing a strong inorganic base, a primary or secondary amine, a hydrazine, a tetramethyl-ammonium hydroxide or a hydroxylamine.

27. The method of claim 26 wherein the amine comprises at least one of methylamine, ethylamine, propylamine, butylamine, ethylenediamine, propylenediamine, butylenediamine, morpholine, piperazine, monoethanolamine, ethylethanolamine, diethanolamine, propanolamine, and dipropanolamine.

28. The method of claim 27 wherein the amine is a monoethanolamine or a mixture of monoethanolamine with aprotic solvent, alcohol, water or a mixture thereof.

29. The method of claim 1 wherein the surface of the poly (aryl ether ketone) substrate is mesoporous with an average pore size between 10 and 50 nanometers.

30. The method of claim 1 wherein the poly (aryl ether ketone) substrate has a pore volume between 40 and 80%.

31. The method of claim 2 wherein a weight ratio between the poly (aryl ether ketone) and pore forming material ranges from 30/70 to 50/50.

32. The method of claim 1 wherein the poly (aryl ether ketone) substrate has an asymmetric pore structure with an average surface pore diameter smaller than an average interior pore diameter by a factor of at least two.

33. The method of claim 2 wherein at least one layer in the separation layer is crosslinked.

34. The method of claim 2 wherein a first layer attached to the poly (aryl ether ketone) substrate is not crosslinked.

35. The method of claim 2 wherein a first and subsequent layers attached to the poly (aryl ether ketone) substrate are formed with functional monomers generating a sequential decrease in the pore size.

36. The method of claim 2 wherein the layer-by-layer deposition process combines incorporation of a surfactant material into the polymeric network.

37. The method of claim 1 wherein the fluid is a water-based solution, a solvent-based solution or a water/solvent mixture.

38. The method of claim 36 wherein the fluid further contains a salt or an organic molecule.

39. The method of claim 38 wherein the organic molecule has a molecular weight below 2000 Da.

40. A method of forming a composite fluid separation membrane, said method comprising the steps of:

(a) forming a blend of a poly (aryl ether ketone) polymer with a polyimide;
(b) forming a shaped article from the blend by melt processing, wherein the article is substantially amorphous;
(c) subjecting a surface of the article to a solvent treatment step that induces crystallization in the surface of the article to a predetermined depth;
(d) subjecting the article to a thermal annealing step to complete crystallization;
(e) introducing functional groups on the surface of the article via reaction with benzophenone segments of a polymeric backbone of the polymer;
(f) bringing the article into contact with a strong inorganic base, a primary amine or hydrazine to affect decomposition of the polyimide;
(g) removing products of polyimide decomposition to form a porous article; and
(h) forming a separation layer on the surface of the porous article, covalently attached to the surface of the porous article, by a layer-by-layer synthesis.

41. The method of claim 40 wherein the separation layer is comprised of multiple layers formed by a sequence of reticulate synthetic steps with reactive monomers, wherein the surface of the porous article is washed after each reactive step to remove an unreacted monomer.

42. The method of claim 41 wherein said reactive monomers in at least one layer comprises a mixture of monomers.

43. The method of claim 40 wherein the separation layer is comprised of multiple layers, wherein at least one layer is formed by reacting multifunctional acid chloride molecules with multifunctional amine group containing molecules, multifunctional acid chloride molecules with multifunctional hydroxyl group containing molecules, multifunctional epoxy molecules with multifunctional amine group containing molecules, or multifunctional epoxy molecules with multifunctional hydroxyl group containing molecules.

44. The method of claim 40 wherein the poly (aryl ether ketone) is a poly (ether ether ketone), a poly (ether ketone ketone), a poly (ether ketone ether ketone ketone) or a poly (ether ketone).

45. The method of claim 40 wherein the porous article is shaped as a film, a frit, a hollow fiber or a monolith.

46. The method of claim 40 wherein the functional groups comprise a hydroxyl group and a first layer is formed by reacting the hydroxyl group with an epoxy functional molecule.

47. The method of claim 46 wherein the epoxy functional molecule is epichlorohydrin or an epoxy group containing polyethylene oxide.

48. A method of forming a composite fluid separation poly (aryl ether ketone) membrane, said method comprising the steps of:

(a) forming a blend of a poly (aryl ether ketone) polymer with a polyimide;
(b) forming a shaped article from the blend by melt processing, wherein the article is substantially amorphous;
(c) subjecting a surface of the article to a solvent treatment step that induces crystallization in the surface of the article to a predetermined depth;
(d) subjecting the article to a thermal annealing step to complete crystallization of the article;
(e) introducing functional groups on the surface of the article via reaction with benzophenone segments of a polymeric backbone of the polymer;

(f) forming a separation layer on the surface of the article, covalently attached to the surface of the article, by a layer-by-layer synthesis;
(g) bringing the article into contact with a strong inorganic base, a primary amine or a hydrazine to affect the decomposition of the polyimide;
(h) removing products of polyimide decomposition from the article; and
(i) recovering the composite membrane.

* * * * *